(12) United States Patent
Tanaka et al.

(10) Patent No.: US 10,129,543 B2
(45) Date of Patent: Nov. 13, 2018

(54) IMAGE COMPRESSING DEVICE AND IMAGE COMPRESSING METHOD

(71) Applicant: FUJITSU LIMITED, Kawasaki-shi, Kanagawa (JP)

(72) Inventors: Ayana Tanaka, Fukuoka (JP); Yasuo Misuda, Inagi (JP); Chikara Imajo, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 15/461,621

(22) Filed: Mar. 17, 2017

(65) Prior Publication Data
US 2017/0280137 A1    Sep. 28, 2017

(30) Foreign Application Priority Data
Mar. 28, 2016 (JP) ................. 2016-064610

(51) Int. Cl.
| | | |
|---|---|---|
| *H04N 19/107* | (2014.01) | |
| *H04N 19/105* | (2014.01) | |
| *H04N 19/159* | (2014.01) | |
| *H04N 19/51* | (2014.01) | |
| *H04N 19/433* | (2014.01) | |
| *H04N 19/53* | (2014.01) | |
| *H04N 19/176* | (2014.01) | |

(52) U.S. Cl.
CPC ......... *H04N 19/107* (2014.11); *H04N 19/105* (2014.11); *H04N 19/159* (2014.11); *H04N 19/433* (2014.11); *H04N 19/51* (2014.11); *H04N 19/53* (2014.11); *H04N 19/176* (2014.11)

(58) Field of Classification Search
USPC ..................................... 375/240.13
See application file for complete search history.

(56) References Cited

U.S. PATENT DOCUMENTS

| | | | |
|---|---|---|---|
| 2001/0041013 A1 | 11/2001 | Yamashita et al. | |
| 2008/0130751 A1* | 6/2008 | Kobayakawa ....... | H04N 19/159 |
| | | | 375/240.16 |

FOREIGN PATENT DOCUMENTS

| | | |
|---|---|---|
| JP | 11-262015 | 9/1999 |
| JP | 2008-141288 | 6/2008 |
| JP | 2010-258530 | 11/2010 |
| JP | 2011-071622 | 4/2011 |
| JP | 2013-126083 | 6/2013 |
| JP | 2013-172350 | 9/2013 |

* cited by examiner

*Primary Examiner* — Nam D Pham
(74) *Attorney, Agent, or Firm* — Fujitsu Patent Center

(57) ABSTRACT

A prefetched-image memory stores a prefetched image of a prefetched area prefetched from a reference image memory that stores a reference image. A processor performs a motion search using a reduced image obtained by reducing an encoding target image and generates a search result for an encoding target block included in the encoding target image. The processor determines, based on the search result, that an area situated outside the prefetched area in the reference image is to be searched when the processor has predicted from the search result that a matching of the encoding target block and the prefetched image will be unsuccessful. Next, the processor performs a matching of the encoding target block and an image of a matching target area including the outside area in the reference image and generates an inter-prediction result. Then, the processor encodes the encoding target block based on the inter-prediction result.

14 Claims, 24 Drawing Sheets

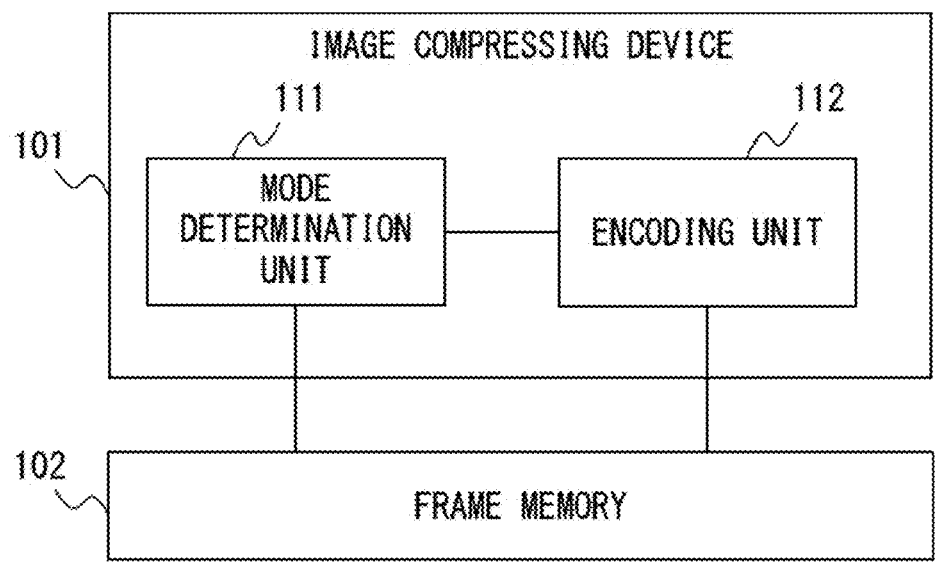
F I G. 1

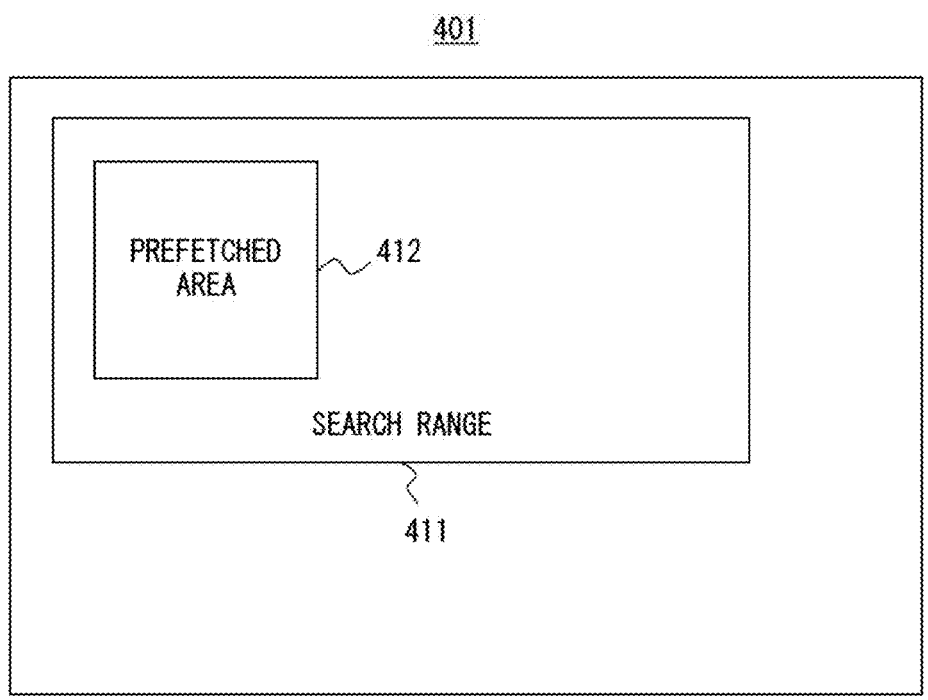
F I G. 4

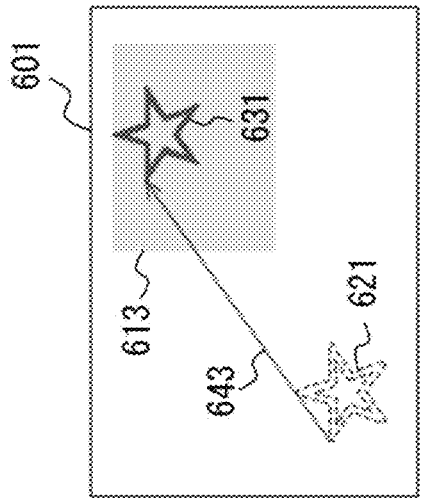
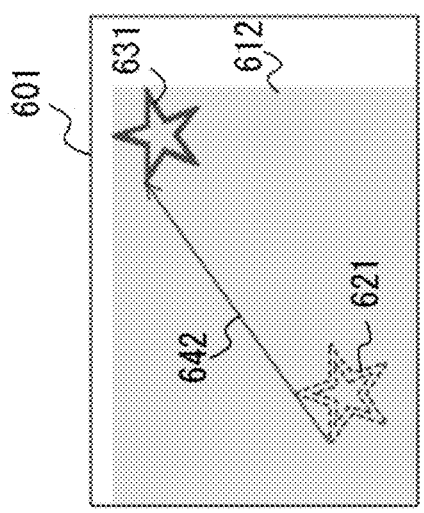
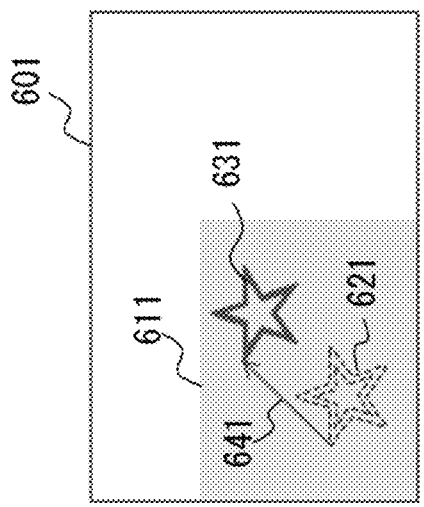
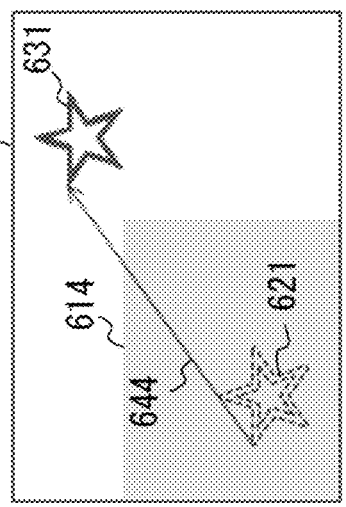

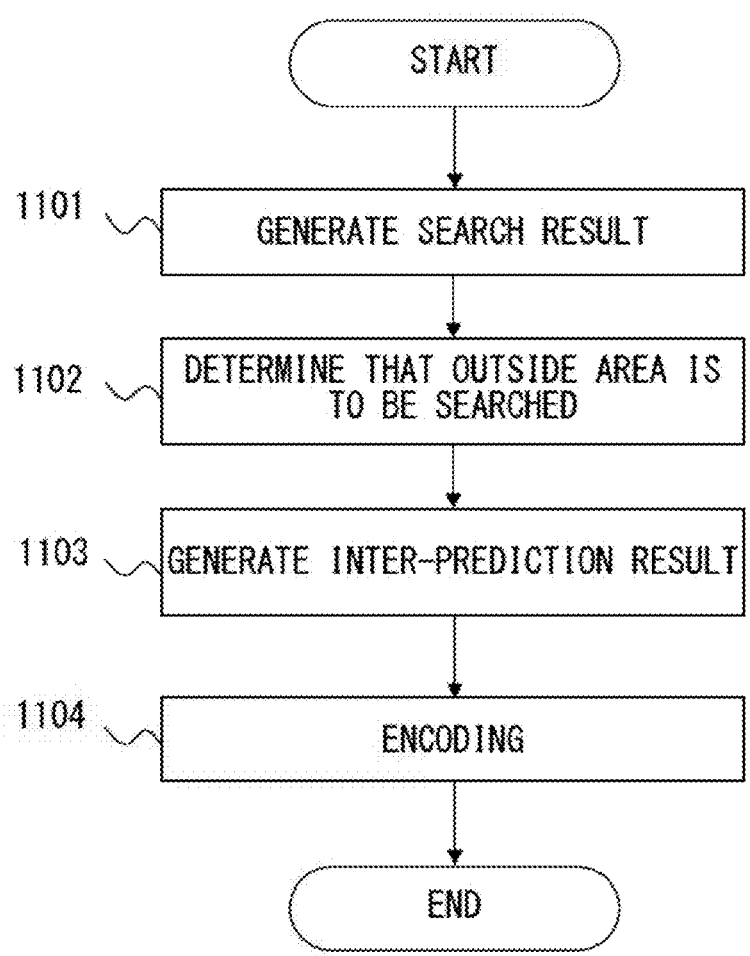
F I G. 1 1

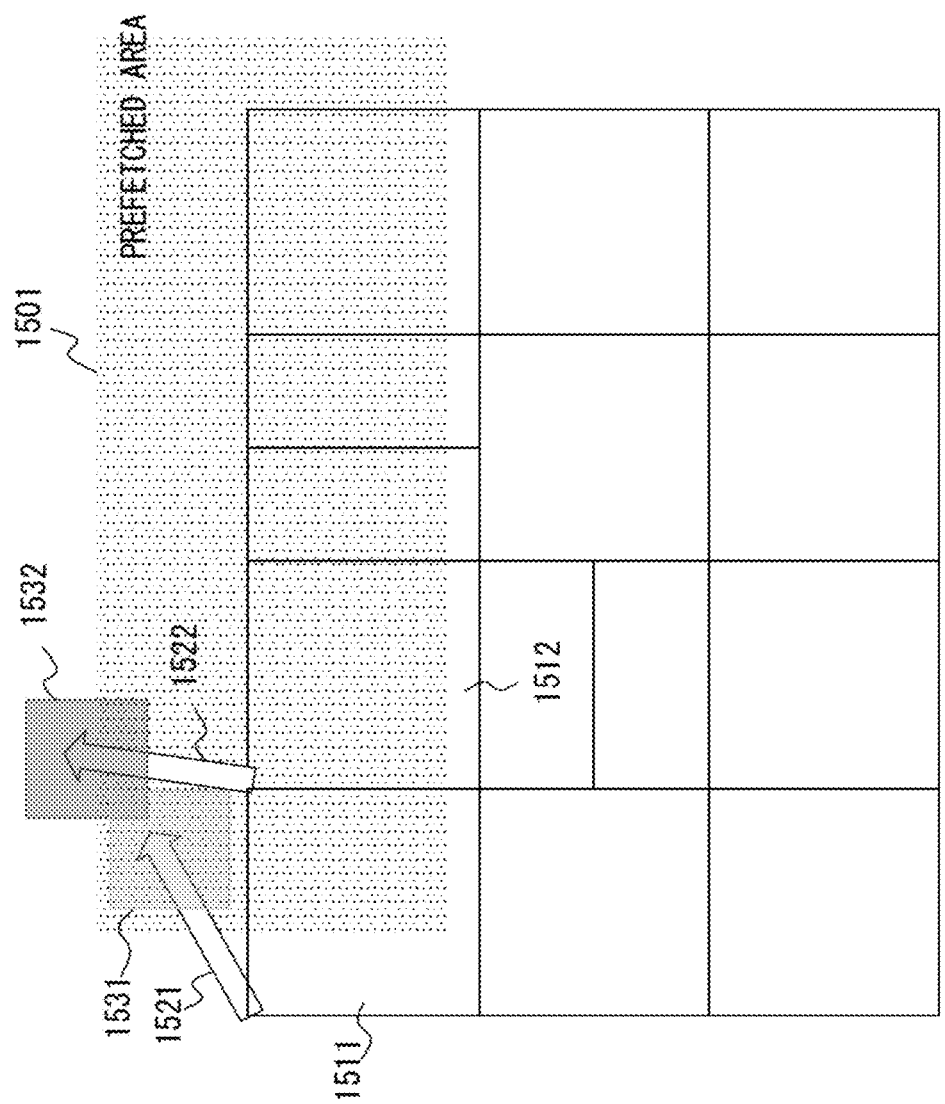

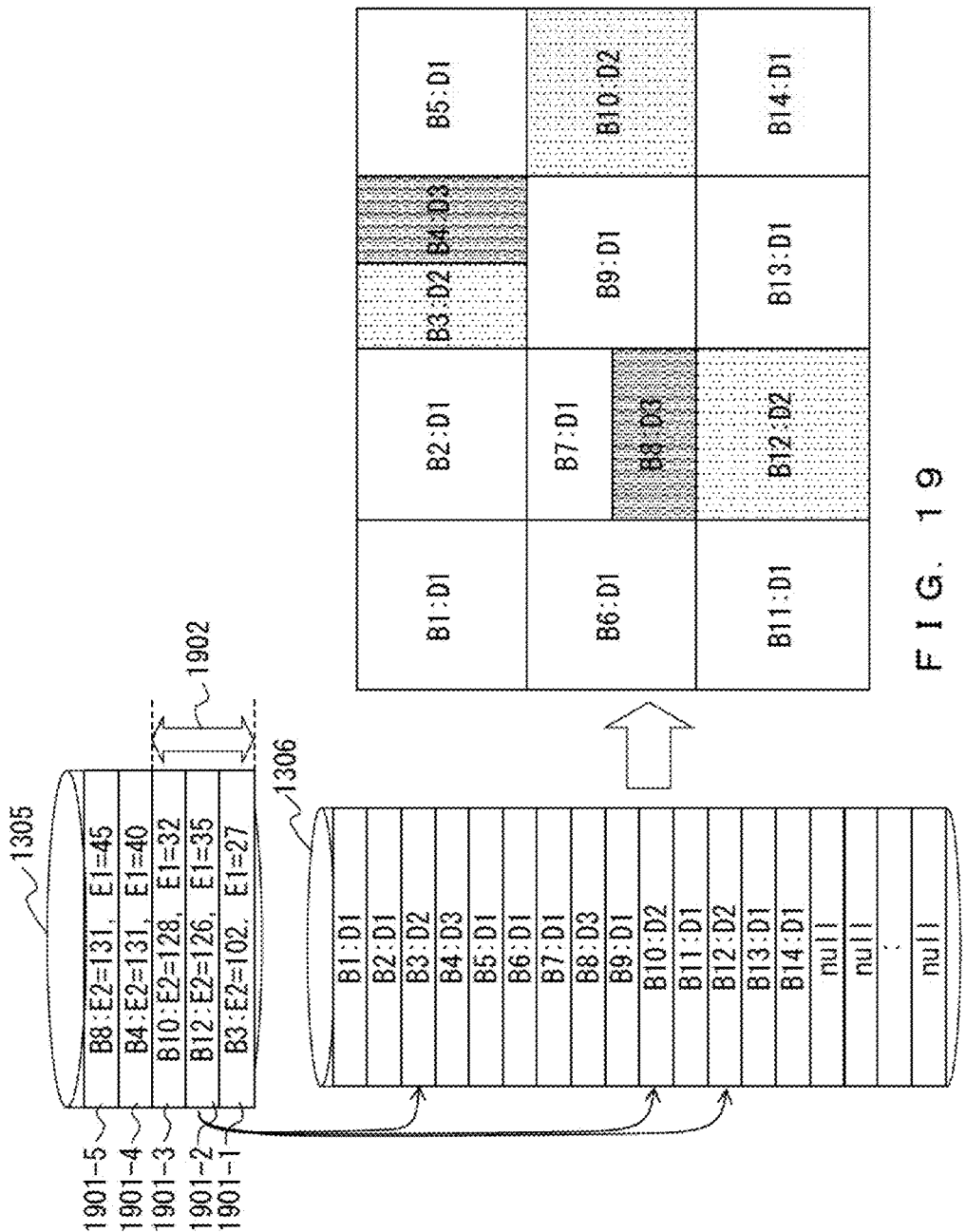

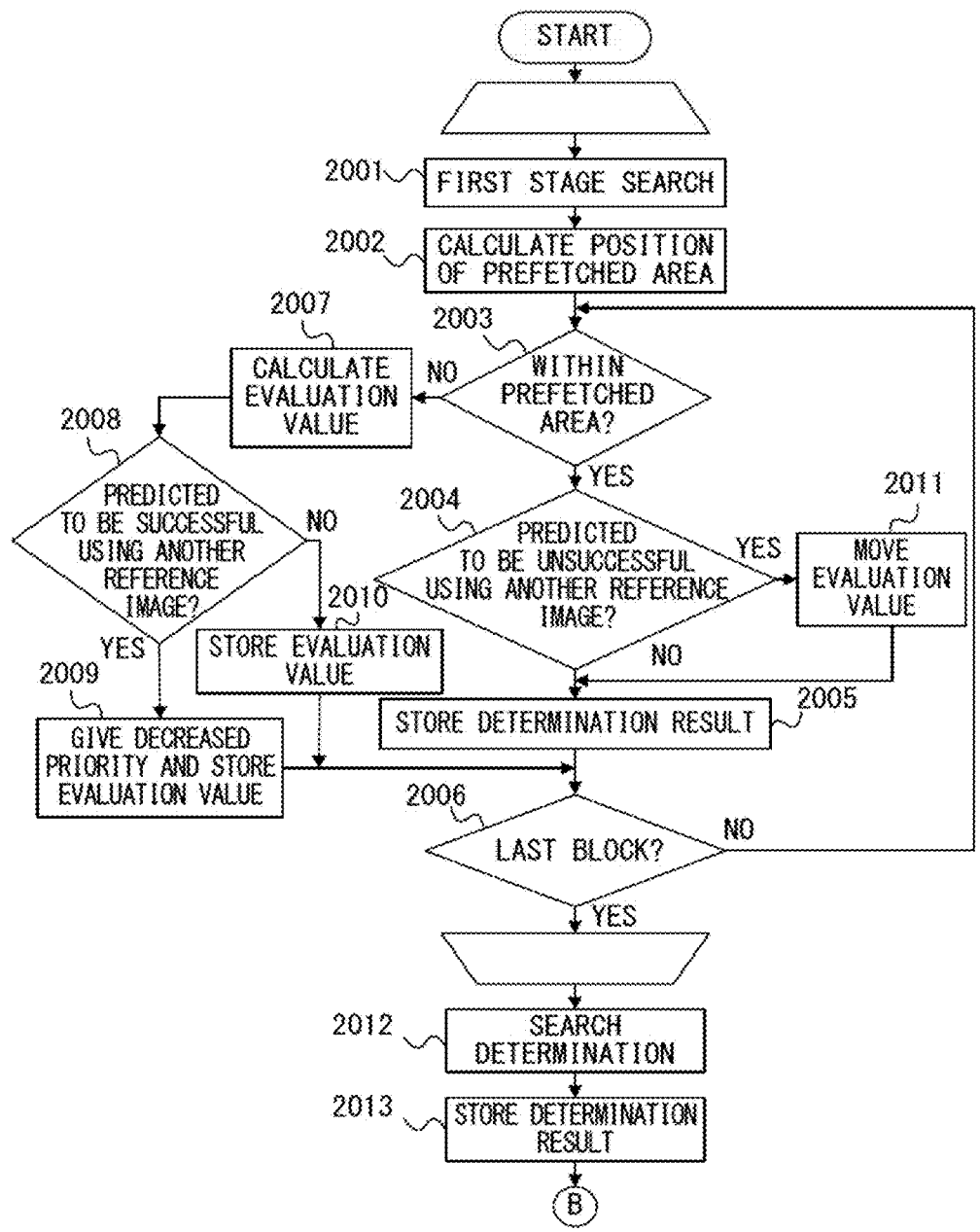
F I G. 2 0 A

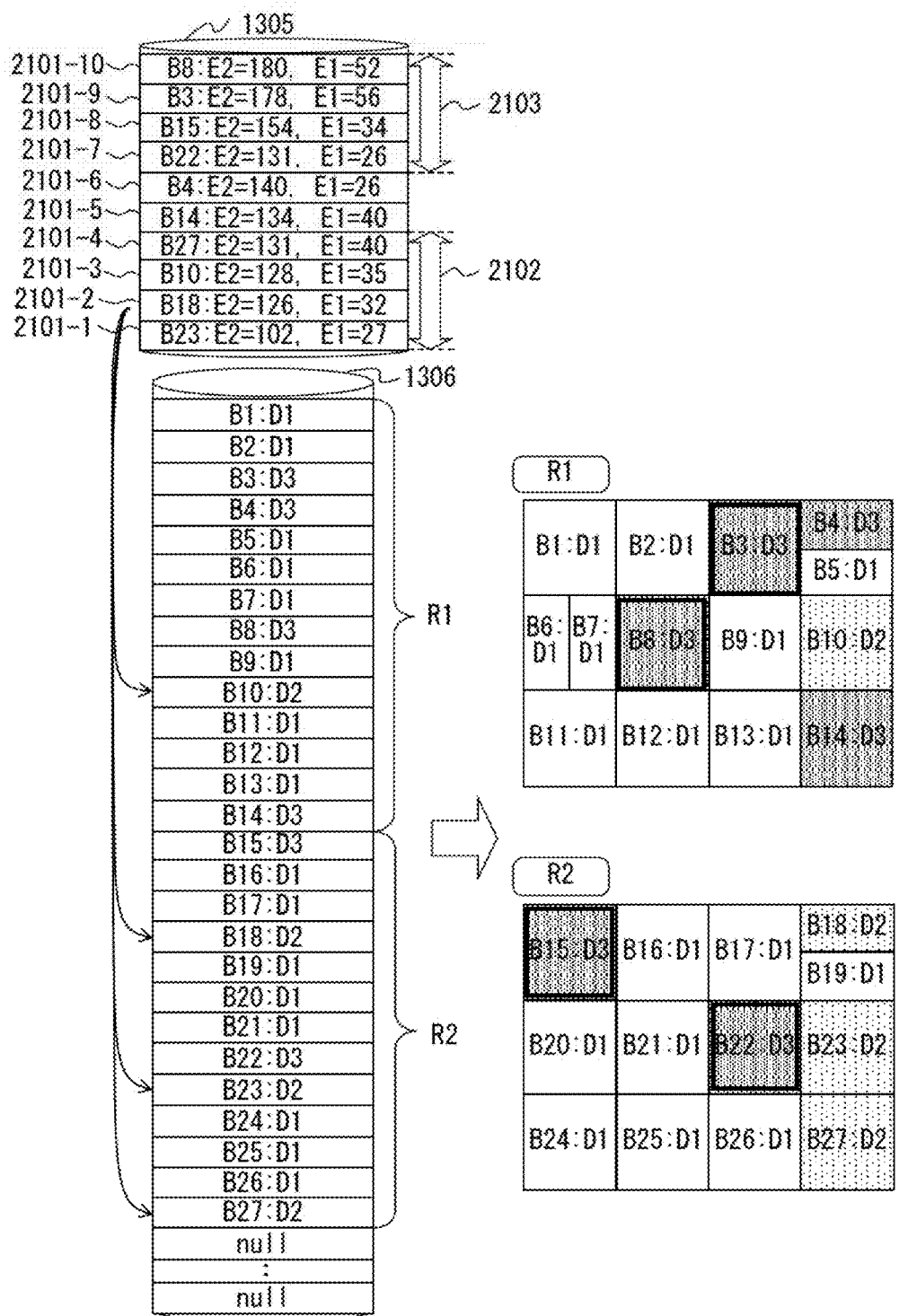
F I G. 2 1

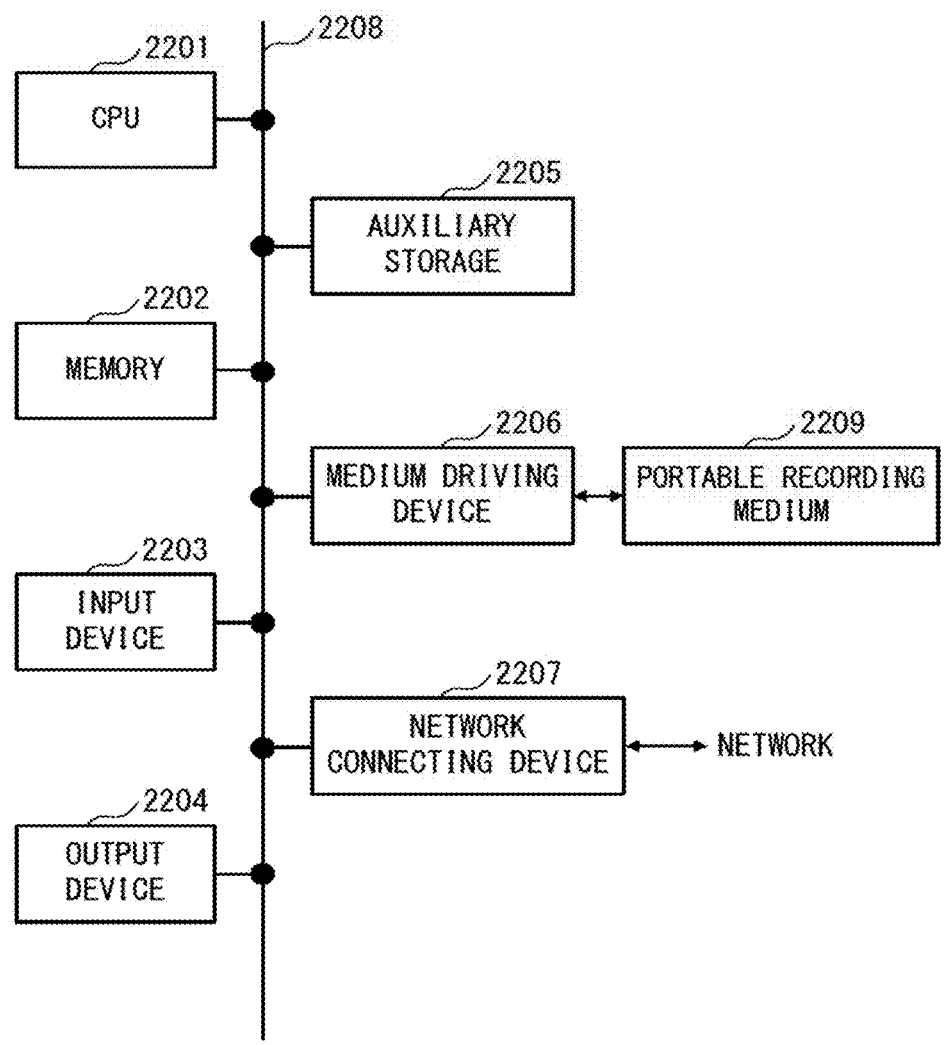
F I G. 2 2

IMAGE COMPRESSING DEVICE AND IMAGE COMPRESSING METHOD

CROSS-REFERENCE TO RELATED APPLICATION

This application is based upon and claims the benefit of priority of the prior Japanese Patent Application No. 2016-064610, filed on Mar. 28, 2016, the entire contents of which are incorporated herein by reference.

FIELD

The embodiments discussed herein are related to an image compressing device and an image compressing method.

BACKGROUND

High-quality and high-compression video content has been distributed in recent years. Further, a real-time performance is often desired for a latest video content distribution in order to accommodate, for example, live broadcasts.

One of the factors that decreases the real-time performance is a memory access to be made to an external memory in order to obtain an image. The memory access to an external memory has a high throughput, so an amount of access is often restricted in an architecture in which a real-time performance is desired.

With respect to a video signal, an image compressing device used for a video content distribution uses an intra-prediction that performs a prediction in a spatial direction (a prediction in a picture) and an inter-prediction that performs a prediction in a time direction (a prediction between pictures). Then, the image compressing device selects a prediction mode whose encoding error is smallest, and generates an encoded stream including the selected prediction mode.

The intra-prediction is a prediction in a picture, so an encoding error is more likely to become large compared to the case of the inter-prediction. On the other hand, the inter-prediction is a prediction between pictures, so a reference image to be predicted is read from a frame memory that is an external memory, with the result that a throughput becomes extremely high compared to the case of the intra-prediction.

A dynamic random access memory (DRAM) is often used as a frame memory that stores a reference image. The DRAM has a high capacity, but it takes a long time to perform a memory access. If the entirety of a reference image for one picture is searched in a motion search in order to perform an inter-prediction, an amount of access to a frame memory becomes huge, which results in an extremely high throughput.

Thus, a portion of a search range of a reference image may be stored in advance as a prefetched area in an internal memory called a prefetch memory (see, for example, Patent Documents 1 to 4). In this case, an amount of access to a frame memory is reduced by searching the prefetched area stored in the prefetch memory. A static random access memory (SRAM) is often used as a prefetch memory. The SRAM has a low capacity even though it enables a high-speed memory access.

Patent Document 1: Japanese Laid-open Patent Publication No. 2013-126083
Patent Document 2: Japanese Laid-open Patent Publication No. 2013-172350
Patent Document 3: Japanese Laid-open Patent Publication No. 2008-141288
Patent Document 4: Japanese Laid-open Patent Publication No. 11-262015

SUMMARY

According to an aspect of the embodiments, an image compressing device includes a prefetched-image memory and a processor.

The prefetched-image memory stores a prefetched image of a prefetched area prefetched from a reference image memory that stores a reference image. The processor performs a motion search using a reduced image obtained by reducing an encoding target image and generates a search result for an encoding target block included in the encoding target image.

The processor determines, on the basis of the search result, that an area situated outside the prefetched area in the reference image is to be searched when the processor has predicted from the search result that a matching of the encoding target block and the prefetched image will be unsuccessful. Next, the processor performs a matching of the encoding target block and an image of a matching target area including the outside area in the reference image when the processor has determined that the outside area is to be searched and generates an inter-prediction result. Then, the processor encodes the encoding target block on the basis of the inter-prediction result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a configuration of an image compressing device;
FIG. 4 illustrates a search range in a reference image;
FIGS. 6A to 6D illustrate relationships between a prefetched area and a motion vector;
FIG. 11 is a flowchart of image compressing processing;
FIG. 15 illustrates a relationship between a matching target area and a prefetched area.

FIG. 19 illustrates a determination result buffer;

FIG. 20A is a flowchart (Part 1) of inter-prediction processing using a plurality of reference images;

FIG. 21 illustrates the determination result buffer of the inter-prediction processing using a plurality of reference images; and FIG. 22 illustrates a configuration of an information processing device.

DESCRIPTION OF EMBODIMENTS

Embodiments will now be described in detail with reference to the drawings.

FIG. 1 illustrates an example of a configuration of an image compressing device. An image compressing device 101 of FIG. 1 includes a mode determination unit 111 and an encoding unit 112. The mode determination unit 111 performs an intra-prediction and an inter-prediction on an input video signal, selects a prediction mode whose encoding error is smallest, and outputs prediction mode information indicating the selected prediction mode to the encoding unit 112.

A video signal includes a plurality of images at a plurality of times. Each of the plurality of images is input to the image compressing device 101 as an encoding target image (an original image). Each of the images may be a color image or a monochrome image. When the image is a color image, the pixel value may be in the RGB format or in the YUV format.

Figure 2:
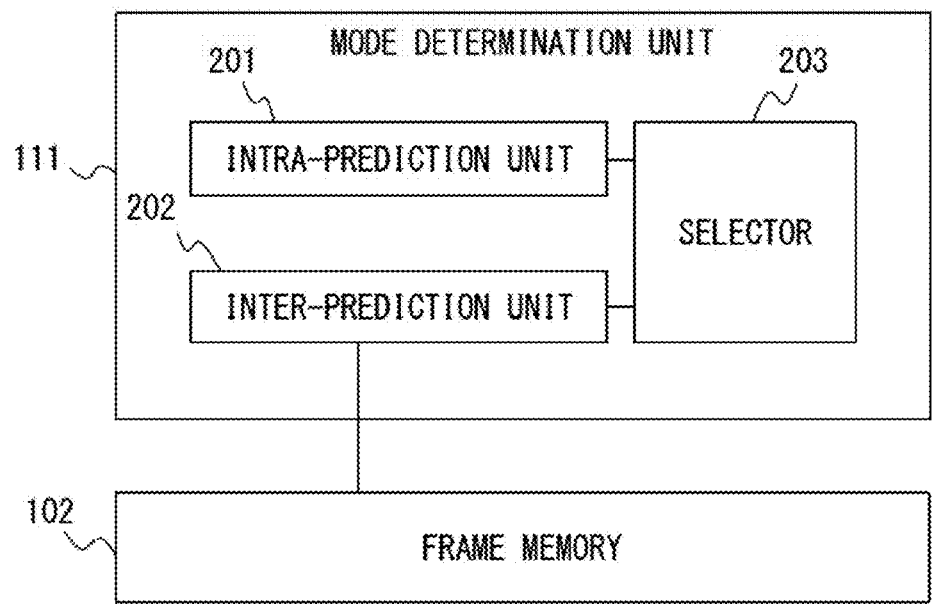
FIG. 2 illustrates a configuration of a mode determination unit.

FIG. 2 illustrates an example of a configuration of the mode determination unit 111 of FIG. 1. The mode determination unit 111 of FIG. 2 includes an intra-prediction unit 201, an inter-prediction unit 202, and a selector 203, and divides an encoding target image into blocks so as to process each block as an encoding target block.

The intra-prediction unit 201 generates an intra-prediction block image of an encoding target block from the pixel values of already encoded perimeter pixels in an encoding target image. The inter-prediction unit 202 reads a reference image used for a motion search from a frame memory 102 that is an external memory and performs a motion compensation on an encoding target block, so as to generate an inter-prediction block image.

The selector 203 selects a prediction mode and outputs mode information that includes, for example, a shape of an encoding target block and prediction information. In the case of an intra-prediction, the prediction information includes a prediction direction, and in the case of an inter-prediction, the prediction information includes information on a reference image and a motion vector.

The encoding unit 112 encodes an encoding target block according to the mode information and outputs an encoded stream. The encoding unit 112 performs a frequency conversion, quantization, and an entropy encoding on a prediction error signal that represents a difference between the encoding target block and an intra-prediction block image or an inter-prediction block image, so as to generate an encoded stream.

Here, the encoding unit 112 performs an inverse quantization and an inverse frequency conversion on a result of the quantization of an encoding target block so as to generate a reconfigured prediction error signal, and adds the reconfigured prediction error signal to the prediction block image so as to generate a decoded image. Then, the encoding unit 112 outputs the generated decoded image to the frame memory 102. The frame memory 102 accumulates the decoded image and outputs the accumulated decoded image to the mode determination unit 111 as a reference image.

The image compressing device 101 transmits the generated encoded stream to an image restoring device (not illustrated), and the image restoring device decodes the encoded stream so as to restore a video signal. For example, H. 264 or high-efficiency video coding (HEVC) is used as an encoding scheme.

The image compressing device 101 is used for various applications. For example, the image compressing device 101 can also be incorporated into a video camera, a video transmitter, a video receiver, a video phone system, a computer, or a cellular phone.

When an inter-prediction has been unsuccessful, or when an inter-prediction is not performed in time in an architecture having a high real-time performance, the mode determination unit 111 applies an intra-prediction to an encoding target block. When a determination of a prediction mode on the basis of an encoded error is not performed in this way, data volume after encoding is likely to be increased, which results in a decrease in compression efficiency.

When the inter-prediction unit 202 generates an inter-prediction block image, the inter-prediction unit 202 detects a movement between pictures using a motion search. The motion search performs a block matching for each block, and an area similar to an encoding target block in a reference image is searched for. Then, a motion vector of the encoding target block, a sum-of-absolute differences (SAD) between the encoding target block and a reference image, and a divided shape of the encoding target block are determined as a result of the block matching. Data volume after entropy encoding can be reduced by selecting a motion vector and a divided shape which make the SAD small, which permits an improvement in compression efficiency.

Figure 3:
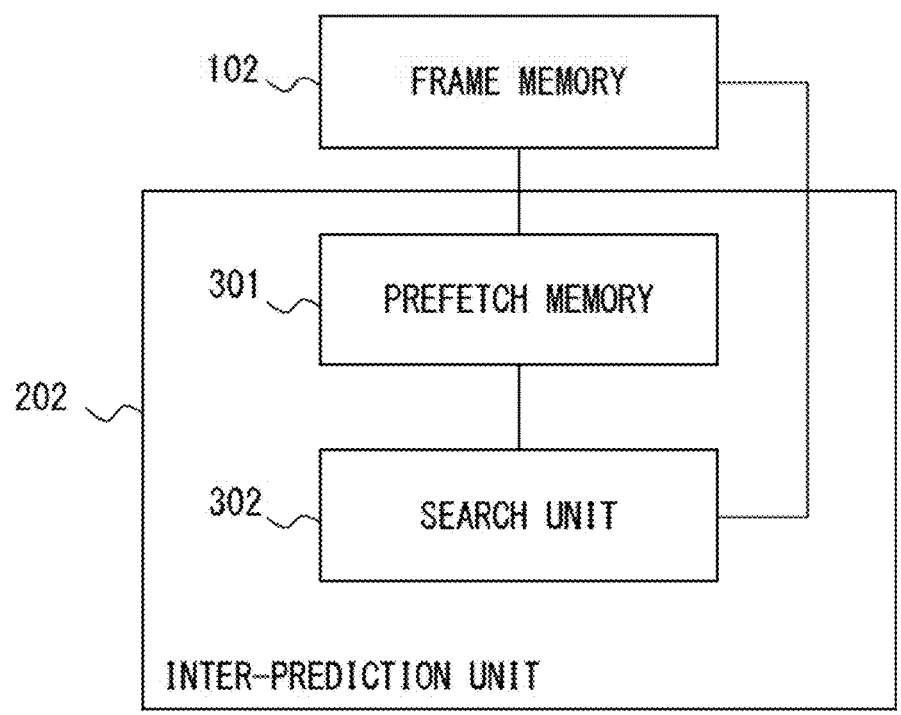
FIG. 3 illustrates a configuration of an inter-prediction unit.

FIG. 3 illustrates an example of a configuration of the inter-prediction unit 202 of FIG. 2. The inter-prediction unit 202 of FIG. 3 includes a prefetch memory 301 and a search unit 302. The prefetch memory 301 stores an image of a prefetched area prefetched from a reference image stored in the frame memory 102.

FIG. 4 illustrates an example of a search range in a reference image. A partial area in a search range 411 in a reference image 401 of FIG. 4 is stored in the prefetch memory 301 in advance as a prefetched area 412. Using data of the prefetched area 412, the search unit 302 performs a block matching while suppressing as much access to the frame memory 102 as possible.

Figure 5:
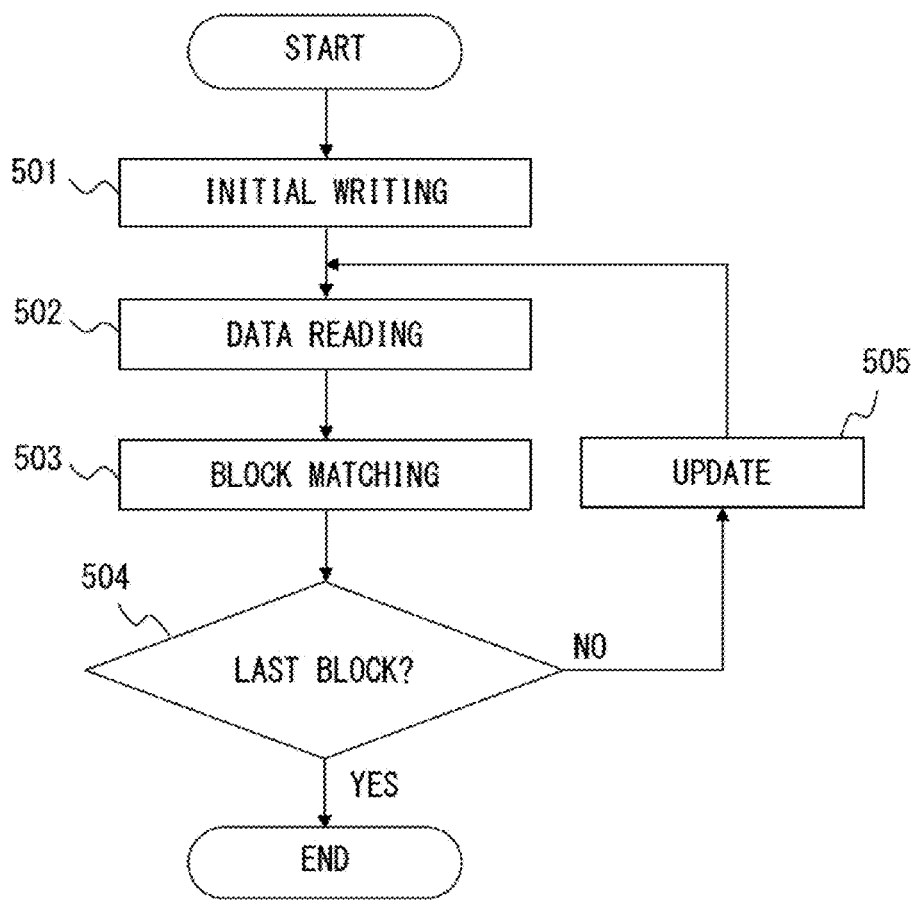
FIG. 5 is a flowchart of motion search processing.

FIG. 5 is a flowchart that illustrates an example of motion search processing performed by the inter-prediction unit 202 of FIG. 3. First, the inter-prediction unit 202 performs an initial writing so as to write data of a partial area of a reference image to the prefetch memory 301 (Step 501).

Next, the search unit 302 reads the data from the prefetch memory 301 (Step 502), selects a block, performs a block matching of the selected block and the read data, and generates an inter-prediction result (Step 503). Then, the search unit 302 checks whether the selected block is the last block in an encoding target image (Step 504).

When the selected block is not the last block (Step 504, NO), the inter-prediction unit 202 updates the data in the prefetch memory 301 (Step 505), and the search unit 302 selects a next block so as to repeat the processes of and after Step 502. When the selected block is the last block (Step 504, YES), the inter-prediction unit 202 terminates the processing.

In Step 503, it may be confirmed that the matching target area of a selected block is not within the prefetched area 412. In this case, the search unit 302 searches in an area situated outside the prefetched area 412, or terminates the block matching and reports to the selector 203 that the inter-prediction has been unsuccessful.

When it searches the area situated outside the prefetched area 412, the search unit 302 accesses the frame memory 102 directly and reads data of the outside area. Taking into account the number of accesses to the frame memory 102 and a success rate of a block matching, that is, taking into account operational efficiency and compression efficiency, it would be most efficient if a search were successful in the prefetched area 412.

FIGS. 6A to 6D illustrate examples of relationships between a prefetched area and a motion vector. The case in which an object 631 corresponding to an object 621 that appears in an encoding target image is searched for in a search range 601 of a reference image is discussed.

In the case of FIG. 6A, a motion vector 641 of the object 621 indicates a position in a prefetched area 611, and the object 631 exists in the prefetched area 611. In this case, a block matching will be successful in the prefetched area 611, which provides a good operational efficiency and compression efficiency.

In the case of FIG. 6B, a motion vector 642 of the object 621 indicates a position in a prefetched area 612, and the object 631 exists in the prefetched area 612. In this case, a block matching will be successful in the prefetched area 612, which provides a good operational efficiency and compression efficiency as in the case of FIG. 6A. However, the prefetched area 612 is larger than the prefetched area 611, so the prefetch memory 301 has a higher capacity.

In the case of FIG. 6C, a motion vector 643 of the object 621 indicates a position in a prefetched area 613, and the object 631 exists in the prefetched area 613. In this case, a block matching will be successful in the prefetched area 613, which provides a good operational efficiency and compression efficiency as in the case of FIG. 6A.

In the case of FIG. 6D, a motion vector 644 of the object 621 indicates a position situated outside a prefetched area 614, and the object 631 does not exist in the prefetched area 614. In this case, if the frame memory 102 is accessed in order to search in the area situated outside the prefetched area 614, operational efficiency will be decreased. On the other hand, if it is determined that an inter-prediction has been unsuccessful and an intra-prediction is used, compression efficiency will be decreased.

A prescribed area whose reference point is a position of an encoding target block can be used as a prefetched area, for example, as disclosed in Patent Document 1 or 2. In this case, a rectangular area obtained by expanding the encoding target block upward, downward, leftward and rightward by a prescribed number of pixels is used as a prefetched area.

The prefetched area may be determined by extracting a movement of the entirety of an encoding target image and adding an offset representing the movement of the entirety to a position of the encoding target block. As described above, it is possible to set a prefetched area suitable for an encoding target image by extracting and using characteristics of the encoding target image.

Further, in order to suppress a memory access due to a block matching, a prefetched area may be moved according to a position of an encoding target block, as disclosed in Patent Document 3.

Figure 7:
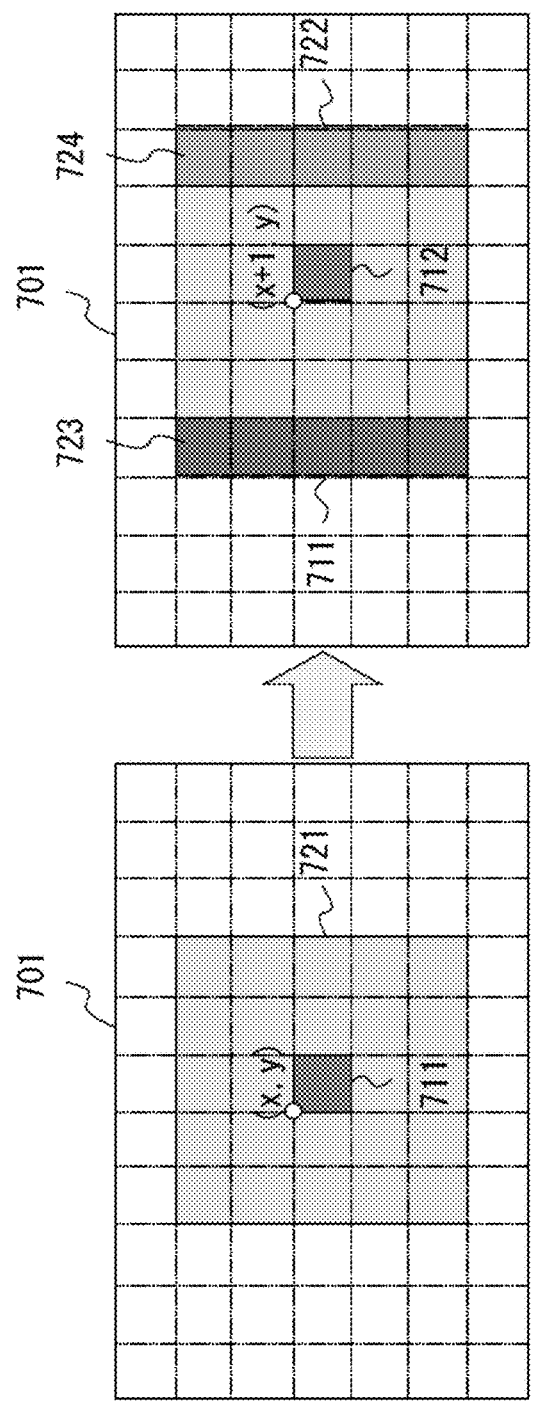
FIG. 7 illustrates a prefetched area that moves in a prescribed direction.

FIG. 7 illustrates an example of a prefetched area that moves in a prescribed direction. When a block 711 situated at a position (x, y) in an encoding target image 701 is an encoding target block, an area 721 is set to be a prefetched area.

Next, when a block 712 situated at a position (x+1, y) becomes an encoding target block, an area 722 is set to be a new prefetched area. In this case, data of an area 723 is discarded, and data of an area 724 is obtained from the frame memory 102.

Figure 8:
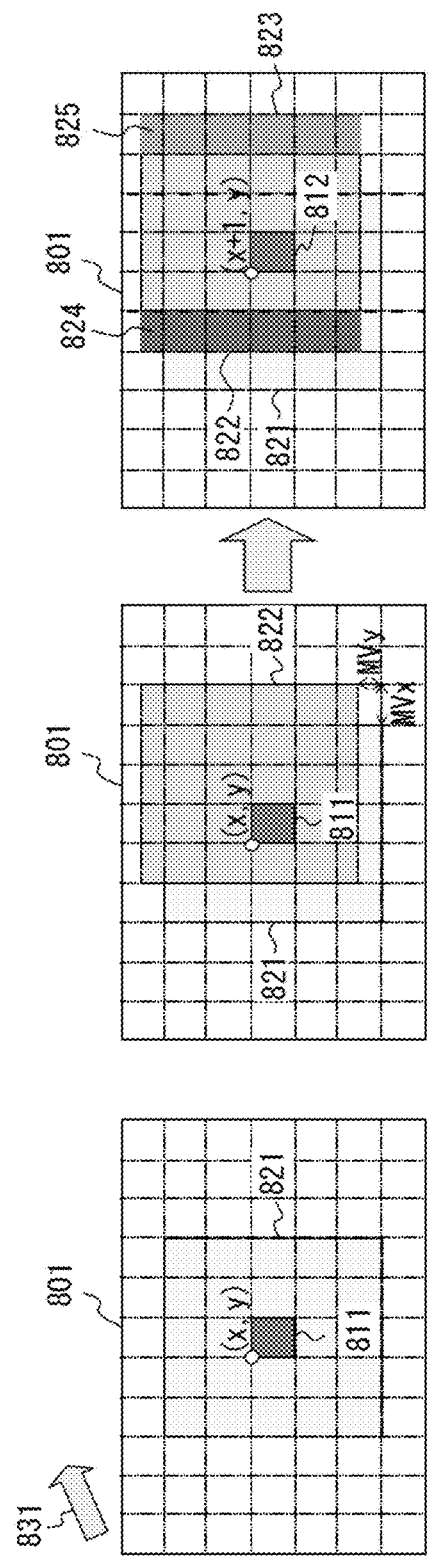
FIG. 8 illustrates a prefetched area that moves adaptively.

FIG. 8 illustrates an example of a prefetched area that moves adaptively according to a movement of the entirety of an image. When a block 811 situated at a position (x, y) in an encoding target image 801 is an encoding target block, (MVx,MVy) is extracted from the encoding target image 801 as a vector 831 that indicates an average movement of the entirety of the image. Then, an area 822 obtained by moving an area 821, which is an old prefetched area, along the vector 831, is set as a prefetched area.

Next, when a block 812 situated at a position (x+1, y) becomes an encoding target block, an area 823 is set as a prefetched area. In this case, data of an area 824 is discarded and data of an area 825 is obtained from the frame memory 102.

As described above, if a prefetched area is moved according to the entirety of an image, it is possible to improve operational efficiency and compression efficiency with respect to, for example, a video in which a panning or a scrolling occurs.

The movement of the entirety of an image can be extracted by a motion search that uses a reduced image obtained by reducing an encoding target image, for example as disclosed in Patent Document 4. The motion search that uses a reduced image is also called a first stage search and is a technology that performs a block matching with a lower degree of accuracy than that of its original image so as to detect a movement of the original image efficiently.

Figure 9:
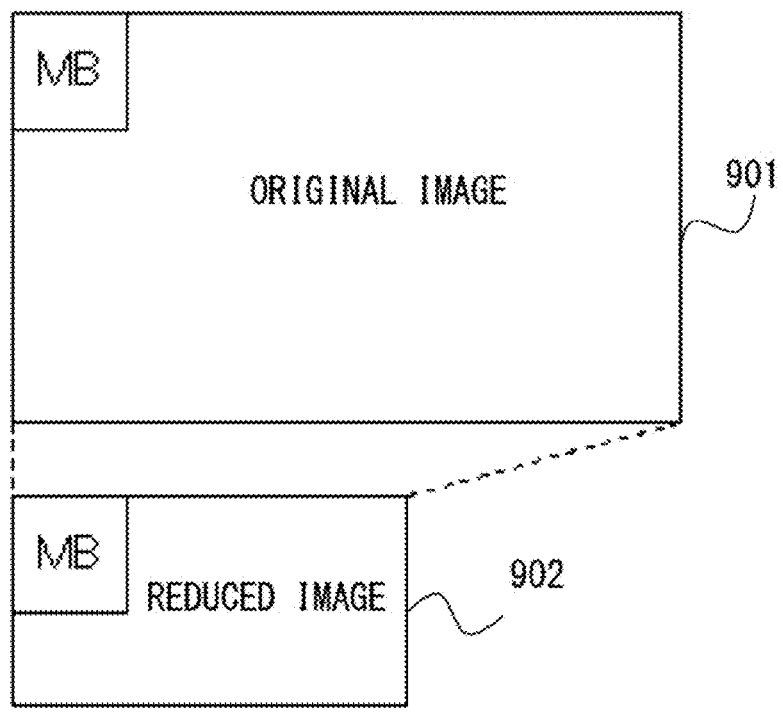
FIG. 9 illustrates an original image and a reduced image.

FIG. 9 illustrates an example of an original image and a reduced image in the encoding scheme based on H. 264. The size of a reduced image 902 is smaller than that of an original image 901, but the size of a macroblock (MB) itself remains unchanged, so a block matching that uses the reduced image 902 is coarse-grained processing. In this case, a motion vector, a SAD, and a divided shape are determined as in the case of a block matching that uses the original image 901.

However, even if a prefetched area is set adaptively according to a movement of the entirety of an image, a matching target area may be situated outside the prefetched area so that a block matching is unsuccessful in the prefetched area. For example, in a video in which a picture is scrolled to the left, there is a good possibility that a matching target area will be situated outside a prefetched area if a movable body such as a vehicle or a train passes through the center of the picture to the right.

As described above, in the case of a video in which a portion of a picture moves largely in a different direction, there exists, in a prefetched area, a block for which a block matching is successful and a block for which a block matching is unsuccessful, which results in an increase in the number of memory accesses to be made to the frame memory 102. However, the number of memory accesses is restricted according to a restriction on a bandwidth of the frame memory 102. Then, if an increased memory access is not allowed to be made, an intra-prediction is selected instead of an inter-prediction, which results in a decrease in compression efficiency.

This problem occurs not only in a video in which a portion of a picture moves largely in a different direction but also in another video in which there is a high probability that a search will be unsuccessful in a prefetched area.

Figure 10:
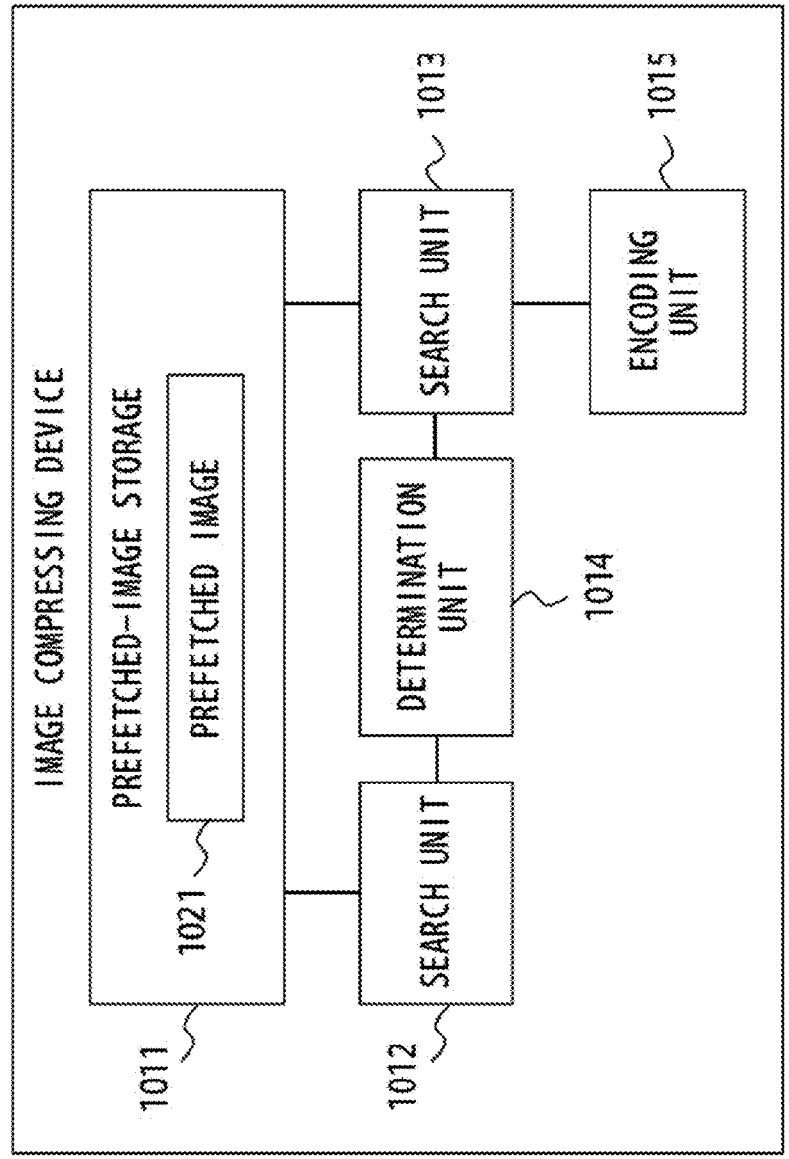
FIG. 10 illustrates a configuration of an image compressing device that uses a prefetched reference image.

FIG. 10 illustrates an example of a configuration of an image compressing device that uses a prefetched reference image. An image compressing device 1001 of FIG. 10 includes a prefetched-image storage 1011, a search unit 1012, a search unit 1013, a determination unit 1014, and an encoding unit 1015. The prefetched-image storage 1011 stores a prefetched image 1021 of a prefetched area prefetched from a reference image storage that stores a reference image.

FIG. 11 is a flowchart that illustrates an example of image compressing processing performed by the image compressing device 1001 of FIG. 10. First, the search unit 1012 performs a motion search using a reduced image obtained by reducing an encoding target image, so as to generate a search result for an encoding target block included in the encoding target image (Step 1101).

Next, when it has been predicted from the search result that a matching of the encoding target block and the prefetched image 1021 will be unsuccessful, the determination unit 1014 determines, on the basis of the search result, that an area situated outside a prefetched area in a reference image is to be searched (Step 1102).

Next, when the determination unit determines that the outside area is to be searched, the search unit 1013 performs a matching of the encoding target block and an image of a matching target area including the outside area in the reference image, so as to generate an inter-prediction result (Step 1103).

Then, the encoding unit 1015 encodes the encoding target block on the basis of the inter-prediction result (Step 1104).

The image compressing device 1001 described above permits an improvement in compression efficiency when image compression is performed using a prefetched reference image.

The image compressing device 101 of FIG. 1 corresponds to the image compressing device 1001 of FIG. 10, the frame memory 102 corresponds to the reference image storage, and the encoding unit 112 corresponds to the encoding unit 1015.

Figure 12:
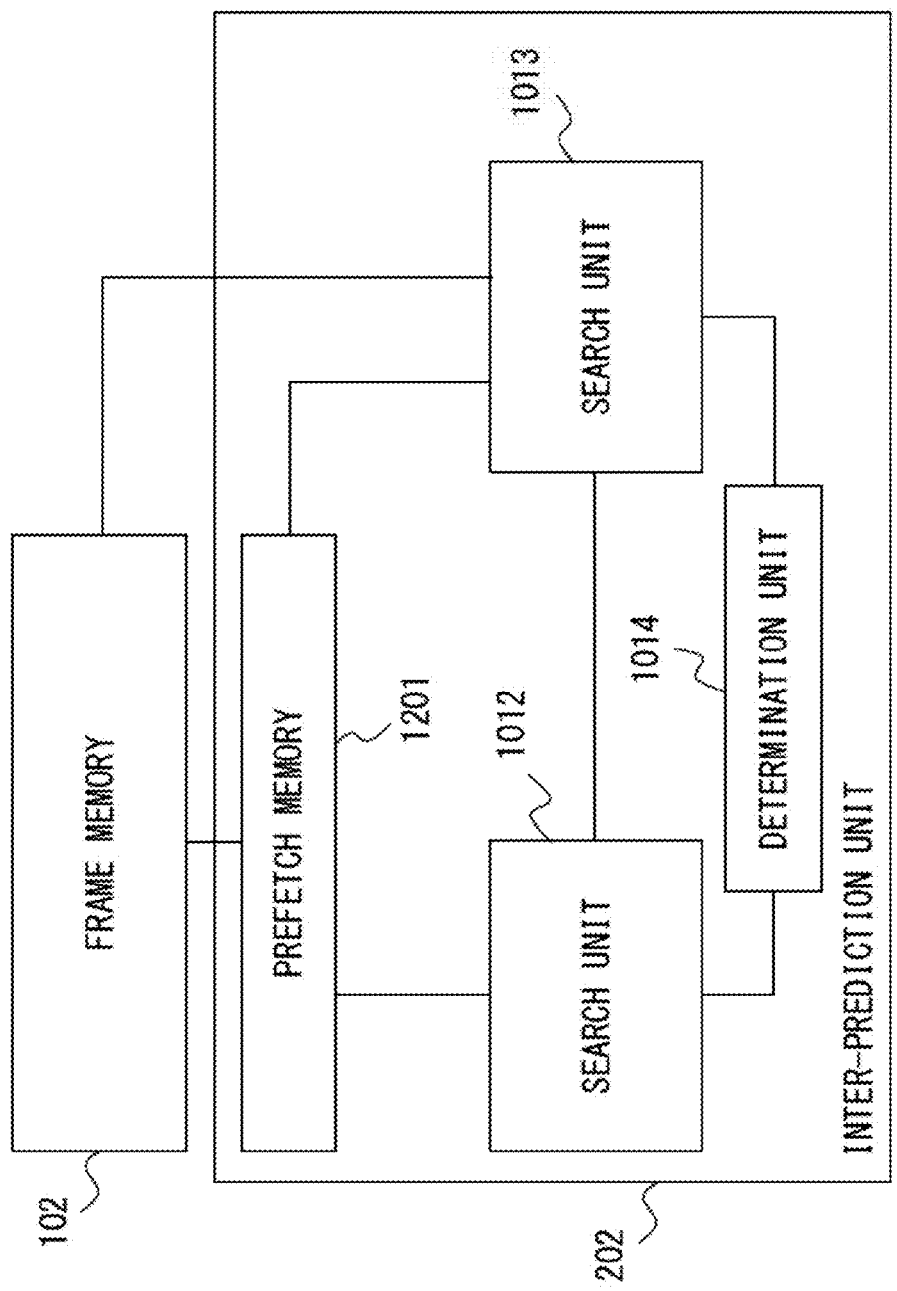
FIG. 12 illustrates a configuration of an inter-prediction unit that performs a first stage search and a latter stage search.

FIG. 12 illustrates an example of a configuration of the inter-prediction unit 202 of FIG. 2. The inter-prediction unit 202 of FIG. 12 includes the search unit 1012, the search unit 1013, the determination unit 1014, and a prefetch memory 1201.

The prefetch memory 1201 corresponds to the prefetched-image storage 1011 of FIG. 10, and stores data of a prefetched area from the frame memory 102. The search unit 1012 performs a first stage search using data stored in the prefetch memory 1201, and the search unit 1013 performs a latter stage search using the data stored in the prefetch memory 1201 and data read from the frame memory 102.

In a first stage search, the search unit 1012 performs a motion search on each block included in an encoding target image using a reduced image obtained by reducing the encoding target image, so as to output a motion vector, a SAD, and a divided shape of each block to the determination unit 1014 as a search result.

Using the search result of the first stage search, the determination unit 1014 determines whether a matching target area of a block matching in a latter stage search is within the prefetch memory 1201. When the matching target area is not within the prefetch memory 1201, the determination unit 1014 determines whether an area situated outside the prefetched area is to be searched when the latter stage search is performed, and outputs a determination result to the search unit 1013.

In the latter stage search, the search unit 1013 performs a motion search of an encoding target block using an original image of the encoding target image according to the determination result output by the determination unit 1014. Then, the search unit 1013 outputs a motion vector, a SAD, and a divided shape of the encoding target block to the selector 203 as an inter-prediction result.

Figure 13:
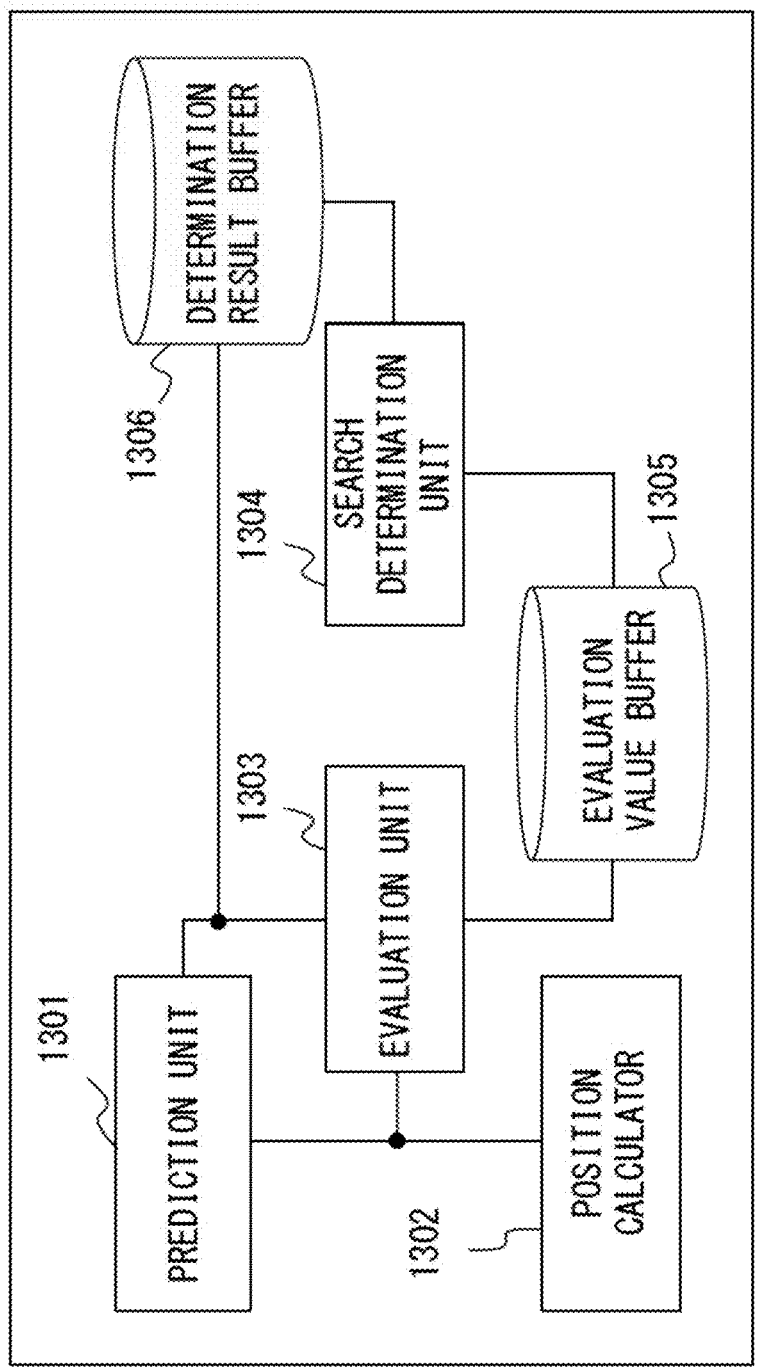
FIG. 13 illustrates a configuration of a determination unit.

FIG. 13 illustrates an example of a configuration of the determination unit 1014 of FIG. 12. The determination unit 1014 of FIG. 13 includes a prediction unit 1301, a position calculator 1302, an evaluation unit 1303, a search determination unit 1304, an evaluation value buffer 1305, and a determination result buffer 1306.

The position calculator 1302 calculates a position of a prefetched area that is prefetched into the prefetch memory 1201 in a latter stage search, and outputs the calculated position of a prefetched area to the prediction unit 1301 and the evaluation unit 1303. For example, a prescribed area whose reference point is a position of an encoding target block is used as a prefetched area.

The prediction unit 1301 obtains a matching target area in a reference image using a motion vector and a divided shape of each block that are included in a search result of a first stage search. Then, the prediction unit 1301 compares the matching target area with a prefetched area output by the position calculator 1302 so as to predict whether a block matching in the prefetched area will be successful, and outputs a prediction result to the evaluation unit 1303. The prediction unit 1301 stores the prediction result in the determination result buffer 1306.

It is possible to accurately predict whether a block matching in a prefetched area will be successful by comparing a matching target area with the prefetched area.

When a block matching in the prefetched area has been unsuccessful, the evaluation unit 1303 calculates an evaluation value that represents a priority of searching in an area situated outside the prefetched area, and stores the calculated evaluation value in the evaluation value buffer 1305 for each block. Accordingly, an evaluation value of each block in an encoding target image is accumulated in the evaluation value buffer 1305. For example, an evaluation value of the number of accesses to be made to the frame memory 102 in order to read data of an area situated outside a prefetched area is used as the evaluation value.

The search determination unit 1304 refers to the evaluation value buffer 1305 and compares the evaluation values of blocks so as to determine whether the area situated outside the prefetched area is to be searched with respect to each of the blocks, and stores a determination result in the determination result buffer 1306.

For example, the image compressing device 1001 may be implemented as, for example, a hardware circuit. In this case, each component of the image compressing device 1001 may be implemented as an individual circuit or all the components may be implemented as one integrated circuit.

Figure 14A:
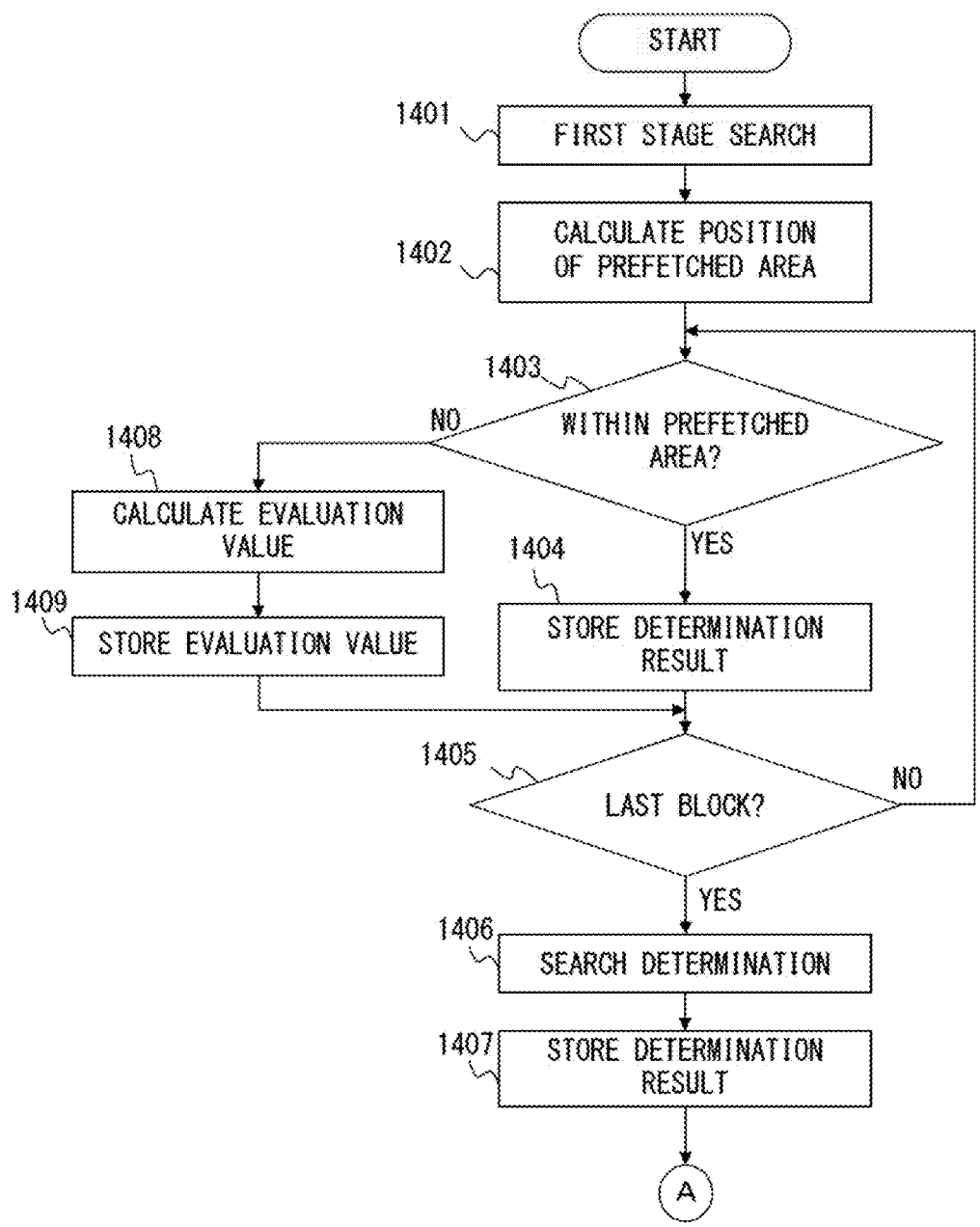
FIG. 14A is a flowchart of inter-prediction processing (Part 1)
Figure 14B:
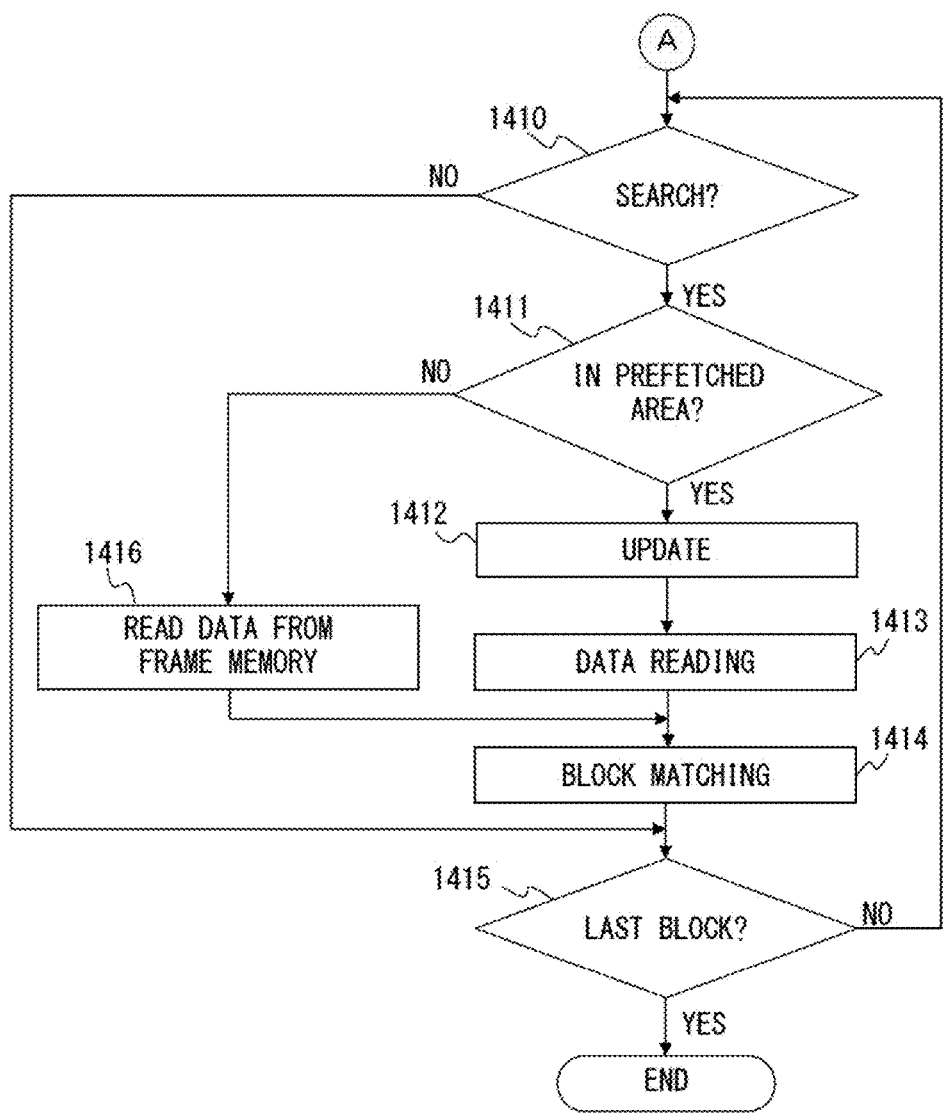
FIG. 14B is the flowchart of the inter-prediction processing (Part 2)

FIGS. 14A and 14B are a flowchart that illustrates an example of inter-prediction processing performed by the inter-prediction unit 202 of FIG. 12. First, the search unit 1012 performs a first stage search so as to generate a search result including a motion vector, a SAD, and a divided shape of each block (Step 1401), and the position calculator 1302 of the determination unit 1014 calculates a position of a prefetched area (Step 1402).

Next, the prediction unit 1301 selects a block included in the search result of the first stage search, and obtains a matching target area in a reference image using a motion vector and a divided shape of the block. Then, the prediction unit 1301 checks whether the matching target area is within the prefetched area (Step 1403).

When the matching target area is within the prefetched area, the prediction unit 1301 predicts that a block matching in the prefetched area will be successful. When the matching target area is not within the prefetched area, the prediction unit 1301 predicts that a block matching in the prefetched area will be unsuccessful.

FIG. 15 illustrates an example of a relationship between a matching target area and a prefetched area. A matching target area 1531 for a block 1511 from among blocks used in a first stage search is a prescribed area whose reference point is a position indicated by a motion vector 1521 of the block 1511. On the other hand, a matching target area 1532 for a block 1512 is a prescribed area whose reference point is a position indicated by a motion vector 1522 of the block 1512.

In this case, the matching target area 1531 is within a prefetched area 1501, so it is predicted that a block matching for the block 1511 will be successful. On the other hand, the matching target area 1532 is not within the prefetched area 1501, so it is predicted that a block matching for the block 1512 will be unsuccessful.

When it has been predicted that a block matching will be successful (Step 1403, YES), the prediction unit 1301 stores a prediction result in the determination result buffer 1306 as a determination result (Step 1404). In this case, the determination result indicating that a usual block matching in a prefetched area is to be performed is stored in the determination result buffer 1306.

Next, the prediction unit 1301 checks whether the selected block is the last block included in the search result of the first stage search (Step 1405). When the selected block is not the last block (Step 1405, NO), the prediction unit 1301 selects a next block and repeats the processes of and after Step 1403.

When it has been predicted that a block matching will be unsuccessful (Step 1403, NO), the evaluation unit 1303 calculates an evaluation value that represents a priority of searching in an area situated outside a prefetched area (Step 1408), and stores the evaluation value in the evaluation value buffer 1305 (Step 1409). Then, the prediction unit 1301 performs the processes of and after Step 1405.

When the selected block is the last block (Step 1405, YES), the search determination unit 1304 determines, on the basis of the evaluation value in the evaluation value buffer 1305, whether an area situated outside the prefetched area is to be searched with respect to each block (Step 1406). Then, the search determination unit 1304 stores a determination result in the determination result buffer 1306 (Step 1407). In this case, one of a determination result indicating that the area situated outside the prefetched area is to be searched so as to perform a block matching and a determination result indicating that the search is not to be performed is stored in the determination result buffer 1306.

Next, in a latter stage search, the search unit 1013 selects a block in an encoding target image and checks a determination result, in the determination result buffer 1306, which corresponds to the selected block (Step 1410). When the determination result indicates that a search is to be performed (Step 1410, YES), the search unit 1013 checks whether the determination result indicates a block matching in the prefetched area (Step 1411).

When the determination result indicates a block matching in the prefetched area (Step 1411, YES), the search unit 1013 updates data of the prefetched area in the prefetch memory 1201 (Step 1412). Next, the search unit 1013 reads the data from the prefetch memory 1201 (Step 1413) and performs a block matching of the selected block and the read data so as to generate an inter-prediction result (Step 1414).

Then, the search unit 1013 checks whether the selected block is the last block in the encoding target image (Step 1415). When the selected block is not the last block (Step 1415, NO), the search unit 1013 selects a next block and repeats the processes of and after Step 1410.

When the determination result indicates a block matching in an area situated outside the prefetched area (Step 1411, NO), the search unit 1013 reads data of the outside area from the frame memory 102 (Step 1416). Next, the search unit 1013 performs a block matching of the selected block and data of a matching target area that includes the read data, so as to generate an inter-prediction result (Step 1414). Then, the search unit 1013 performs the processes of and after Step 1415.

When the determination result indicates that a search is not to be performed (Step 1410, NO), the search unit 1013 performs the processes of and after Step 1415 without performing a block matching. In this case, an inter-prediction result is not generated, so the selector 203 selects an intra-prediction result as a prediction result of the selected block. When the selected block is the last block (Step 1415, YES), the search unit 1013 terminates the processing.

Figure 16:
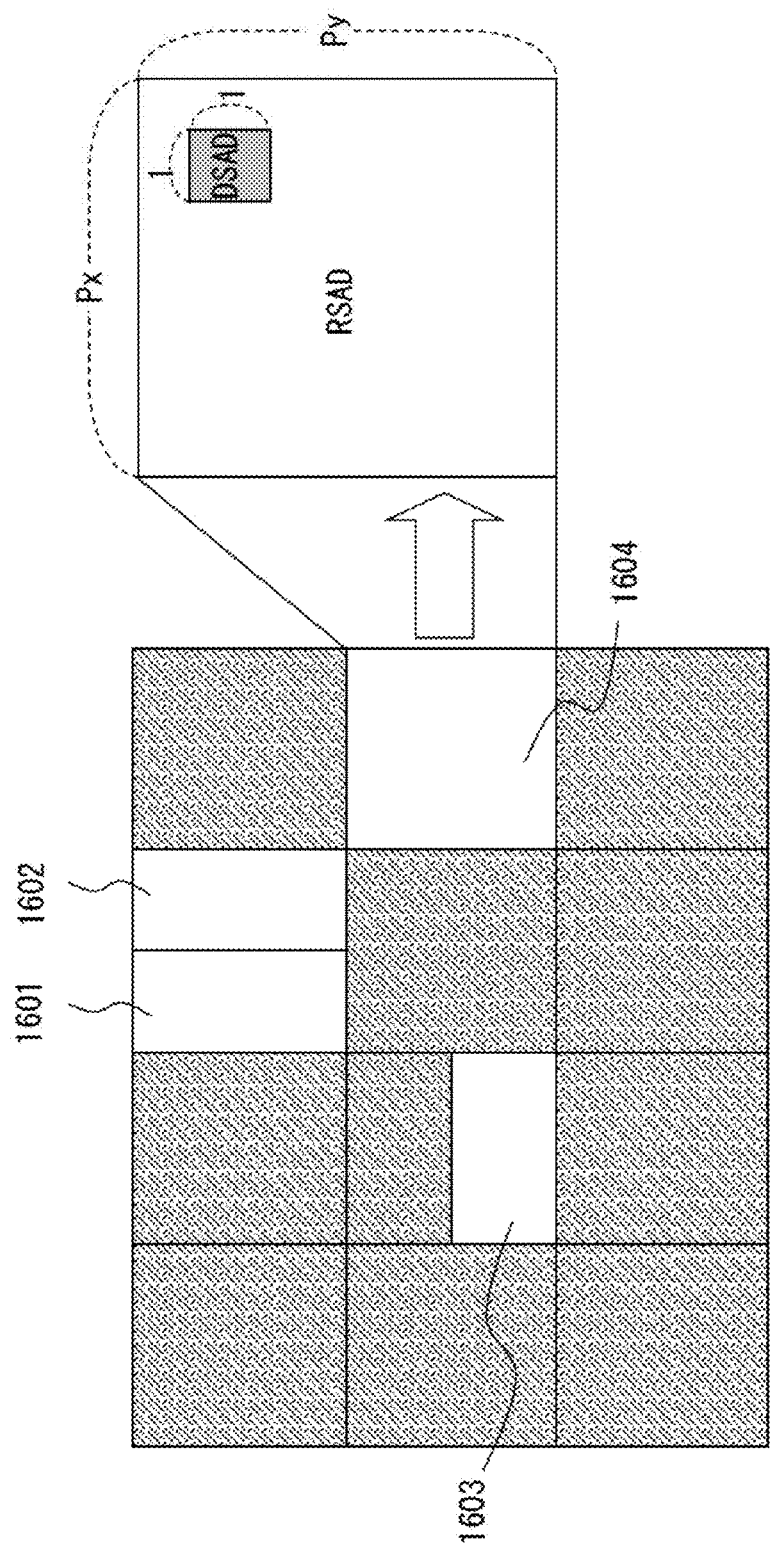
FIG. 16 illustrates a prediction result.

FIG. 16 illustrates an example of the prediction result in Step 1403. With respect to a block marked by shading in FIG. 16, it is predicted that a block matching in a prefetched area will be successful, and with respect to blocks 1601 to 1604 other than the shaded blocks, it is predicted that a block matching in a prefetched area will be unsuccessful.

In this case, an evaluation value for each of the blocks 1601 to 1604 is calculated in Step 1408. Here, for example, the evaluation unit 1303 calculates two types of evaluation values, a simple evaluation value E1 and a detailed evaluation value E2, which are calculated by the formulas below.

$$E1 = (Px+\alpha) \times (Py+\alpha) - \beta \qquad (1)$$

$$E2 = ((Px+\alpha) \times (Py+\alpha) - \beta) \times DSAD \qquad (2)$$

$$DSAD = RSAD/(Px \times Py) \qquad (3)$$

Px represents a value obtained by converting the number of pixels in a block in a horizontal direction in a first stage search to the number of pixels in the block in the horizontal direction in a latter stage search, and Py represents a value obtained by converting the number of pixels in the block in a vertical direction in the first stage search to the number of pixels in the block in the vertical direction in the latter stage search.

α represents the number of pixels for expanding the block in the first stage search. For example, when a block matching is performed for each 7×7-rectangular area, a range is used for the block matching that includes each set of three pixels situated at the left, right, top, and bottom of a pixel to be processed, so α=6.

β represents the number of pixels of a portion included in a prefetched area from among a matching target area in the first stage search. With respect to the portion included in the prefetched area, there is no need to perform a new reading from the frame memory 102, so β is subtracted from the number of pixels (Px+α)×(Py+α) of the matching target area.

RSAD represents a SAD in the block in the first stage search, and DSAD represents a value obtained by converting RSAD to one SAD per pixel in the block in the latter stage search.

The number of accesses to be made to the frame memory 102 in order to read data of an area situated outside a prefetched area is proportional to the data volume of the outside area. The simple evaluation value E1 and the detailed evaluation value E2 each represent the data volume of an area situated outside a prefetched area, so they can be used as an indicator of the number of memory accesses to be made in order to read the data of the outside area. The number of memory accesses is smaller in a block whose simple evaluation value E1 or detailed evaluation value E2 is smaller, which provides good operational efficiency. Thus, a priority of searching in an area situated outside a prefetched area is set to be higher for a block whose simple evaluation value E1 or detailed evaluation value E2 is smaller.

The detailed evaluation value E2 is a value obtained by weighting the simple evaluation value E1 using DSAD. If a SAD in an inter-prediction is large, the probability that an intra-prediction result will be selected as a prediction result of a block will be increased because compression efficiency is further improved when an intra-prediction is selected. Thus, the simple evaluation value E1 is multiplied by DSAD used as a weight, which makes a priority for a block with a smaller DSAD higher.

Figure 17:
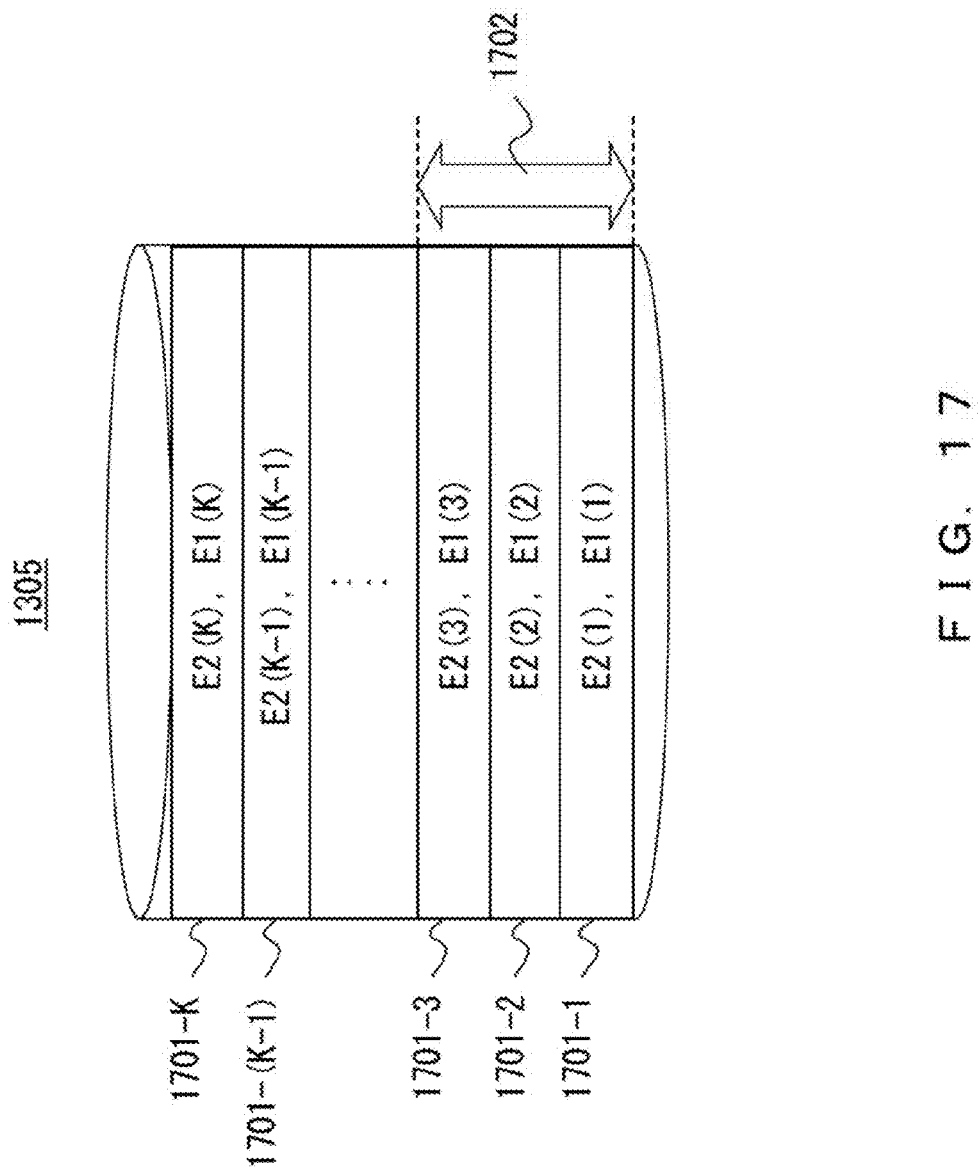
FIG. 17 illustrates an evaluation value buffer.

FIG. 17 illustrates an example of an evaluation value buffer 1305. The evaluation value buffer 1305 stores entries 1701-1 to 1701-K that correspond to K blocks, respectively. K represents the number of blocks for which it has been predicted that a block matching in a prefetched area will be unsuccessful.

An entry 1701-$i$($i$=1 to K) includes a simple evaluation value E1 ($i$) and a detailed evaluation value E2($i$). The entries 1701-1 to 1701-K are sorted in ascending order of E2($i$) used as a first key.

$$E2(1) \leq E2(2) \leq \ldots \leq E2(K) \quad (4)$$

Thus, an entry 1701-1 has the highest priority, and an entry situated farther away from the entry 1701-1 has a lower priority. However, when entries have an equal value of E2($i$), they are sorted in ascending order of E1($i$) used as a second key. When entries have equal values of E2($i$) and E1($i$), they are sorted such that a block larger in size has a higher priority. When entries have equal values of E2($i$) and E1($i$) and are identical in size, either block may have a higher priority.

For example, in Step 1406, the search determination unit 1304 can determine whether an area situated outside a prefetched area is to be searched, using an upper limit N of a sum of E1s that is permitted by an architecture.

In this case, the search determination unit 1304 selects an entry one at a time from among entries in the evaluation value buffer 1305 in decreasing order of priority, so as to calculate a sum of E1($i$)s of selected entries. When the sum of E1($i$)s is not greater than N, the search determination unit 1304 determines that an area situated outside a prefetched area is to be searched for the selected entries. When the sum of E1($i$)s is greater than N, the search determination unit 1304 determines that a search is not to be performed for an entry that has been last selected and the entries subsequent to that.

For example, when E1(1)+E1(2)+E1(3)≤N, it is determined that the area situated outside the prefetched area is to be searched with respect to three blocks that respectively correspond to the entries 1701-1 to 1701-3 included in a range 1702. When E1(1)+E1(2)+E1(3)+E1(4)>N, it is determined that a search is not to be performed with respect to (K−3) blocks that respectively correspond to the entries 1701-4 to 1701-K.

As described above, if it is determined that an outside area is to be searched with respect to a portion of blocks for which a block matching in a prefetched area will be unsuccessful, the number of blocks for which an inter-prediction result is generated is increased in a latter stage search. This permits an increase in the number of blocks for which an inter-prediction result is selected by the selector 203, which results in an improvement in compression efficiency. For example, the upper limit N can be determined as below.

In image compressing processing, a processing time per frame has often been predetermined in order to ensure a real-time performance. In a certain architecture, when the processing time per frame is C1 cycles and it takes up to C2 cycles to encode one frame, a window time per frame is (C1-C2) cycles. It is possible to calculate the number of memory accesses to be made to the frame memory 102 using this window time.

A data volume that can be read per cycle from the frame memory 102 differs by architecture. If it is possible to read data of γ pixels per cycle, the number of pixels that can be read during (C1-C2) cycles is (C1-C2)×γ. In this case, N=(C1-C2)×γ is set.

As described above, if the upper limit N is set to a value permitted by an architecture, it is possible to improve compression efficiency while ensuring operational efficiency.

A latter stage search is not performed on a block for which it has been determined that a search is not to be performed, so it is also possible to add its search time to a window time. A search time when a block matching in a prefetched area is to be performed can be uniquely determined from a divided shape of the block in a first stage search. Thus, if a search time for a block for which it has been determined that a search is not to be performed is added to a window time of (C1-C2) cycles, the value of the upper limit N will be increased.

Figure 18:
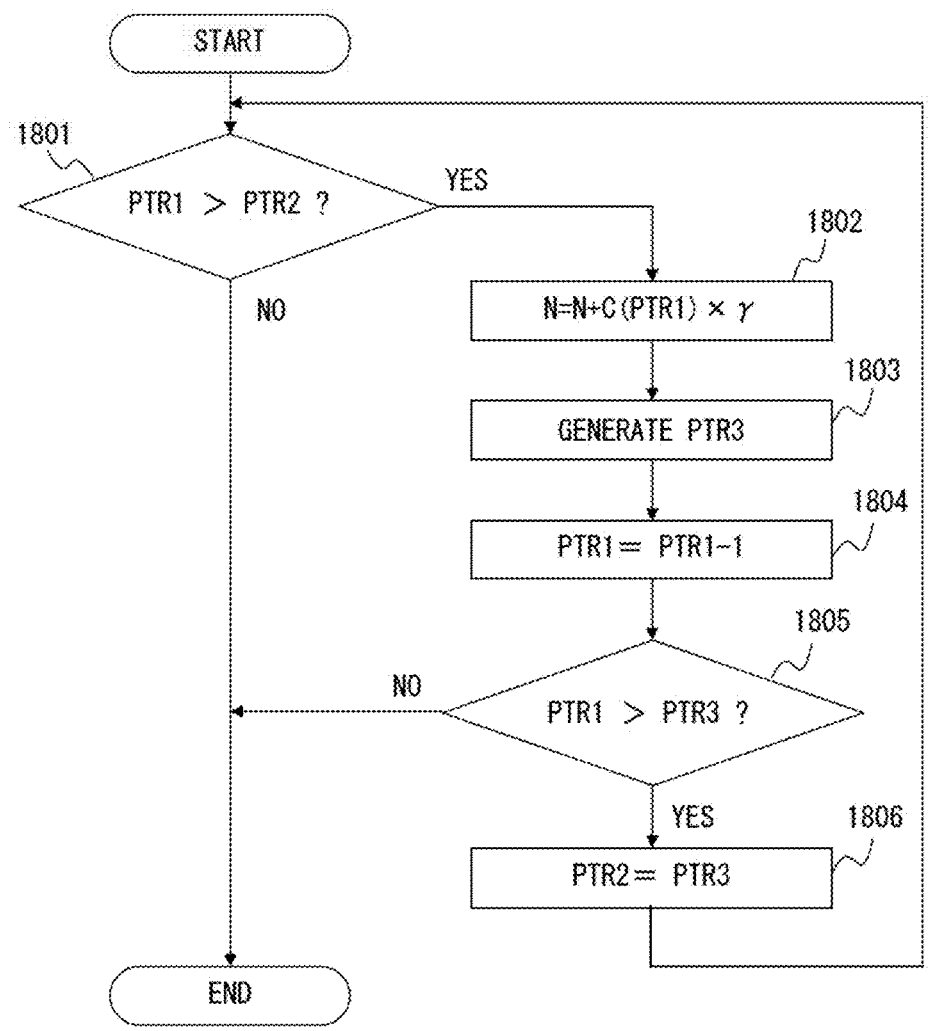
FIG. 18 is a flowchart of updating processing.

FIG. 18 is a flowchart that illustrates an example of processing of updating the upper limit N that is performed by the search determination unit 1304. This updating processing is performed in order to change a determination result after the search determination unit 1304 sets N=(C1-C2)×γ and performs a determination on each entry in the evaluation value buffer 1305.

In this updating processing, a search invalid pointer PTR1 and a search valid pointer PTR2 are used that indicate entries in the evaluation value buffer 1305. For example, when an entry indicated by PTR1 or PTR2 is an entry 1701-$i$, a value of the pointer is i. PTR1 is a pointer that indicates an entry for which it has been determined that a search is not to be performed, and PTR1=K is set upon starting the processing. PTR2 is a pointer that indicates an entry having the lowest priority from among entries for which it has been determined that an area situated outside a prefetched area is to be searched.

First, the search determination unit 1304 compares PTR1 with PTR2 (Step 1801), and when PTR1>PTR2 (Step 1801, YES), it adds C (PTR1)×γ to N (Step 1802). C (PTR1) represents a search time for an entry indicated by PTR1.

Here, with respect to an entry for which it has been determined that a search is not to be performed, the search determination unit 1304 determines again whether an area situated outside a prefetched area is to be searched, using the updated N. Then, the search determination unit 1304 generates a pointer PTR3 that indicates an entry having the lowest priority from among entries for which it has been determined that the outside area is to be searched (Step 1803).

Next, the search determination unit 1304 decrements PTR1 by one (Step 1804) and compares PTR1 with PTR3 (Step 1805). When PTR1>PTR3 (Step 1805, YES), the search determination unit 1304 sets PTR3 to be PTR2 so as to update PTR2 (Step 1806). Then, the search determination unit 1304 repeats the processes of and after Step 1801.

When PTR1≤PTR2 (Step 1801, NO) or when PTR1≤PTR3 (Step 1805, NO), the search determination unit 1304 terminates the processing.

This updating processing permits an increase in the number of blocks for which an area situated outside a prefetched area is to be searched, by adding, to N, the number of pixels that can be read using an extra cycle of a block for which a search is not to be performed, which results in a further improvement in compression efficiency.

FIG. 19 illustrates an example of the determination result buffer 1306. In this example, an encoding target image is divided into 14 blocks B1 to B14 in a first stage search.

From among these blocks, with respect to the blocks B1, B2, B5 to B7, B9, B11, B13, and B14, it is predicted that a block matching in a prefetched area will be successful. On the other hand, with respect to the blocks B3, B4, B8, B10, and B12, it is predicted that a block matching in the prefetched area will be unsuccessful.

In this case, a determination result D1 is stored in entries for the blocks B1, B2, B5 to B7, B9, B11, B13, and B14 in the determination result buffer 1306. The determination result D1 indicates that a block matching in a prefetched area is to be performed.

The evaluation value buffer 1305 stores, in ascending order of E2, entries 1901-1 to 1901-5 that respectively correspond to five blocks for which it has been predicted that a block matching will be unsuccessful. The following are values of E2 and E1 of each of the entries.
Entry 1901-1 B3 E2=102, E1=27
Entry 1901-2 B12 E2=126, E1=35
Entry 1901-3 B10 E2=128, E1=32
Entry 1901-4 B4 E2=131, E1=40
Entry 1901-5 B8 E2=131, E1=45

For example, when the upper limit N is 100, a sum of E1s of the entries 1901-1 to 1901-3 in a range 1902 is 94, which is not greater than N. Then, with respect to the blocks B3, B12, and B10, it is determined that an area situated outside a prefetched area is to be searched, and a determination result D2 is stored in the entries for these blocks in the determination result buffer 1306. The determination result D2 indicates that an area situated outside a prefetched area is to be searched to perform a block matching.

On the other hand, with respect to the blocks B4 and B8, it is determined that a search is not to be performed, and a determination result D3 indicating that a search is not to be performed is stored in the entries for these blocks in the determination result buffer 1306.

In the example of FIG. 19, the encoding target image is divided into 14 blocks, but in image compressing processing using H. 264 or HEVC, an encoding target image is large in size, so it is divided into a greater number of blocks. In this case, the number of blocks for which it is determined that an area situated outside a prefetched area is to be searched is also increased, which results in largely improving compression efficiency while suppressing a decrease in operational efficiency.

It is best to use both the simple evaluation value E1 and the detailed evaluation value E2, but it is also possible to perform a search determination using the simple evaluation value E1 only. In this case, the evaluation value buffer 1305 sorts entries in ascending order of E1 and stores them, and the search determination unit 1304 selects an entry for which an outside area is to be searched within a range specified by the upper limit N of a sum of E1s.

In image compressing processing using H. 264 or HEVC, a plurality of reference images are provided for one encoding target image, which results in being able to select, for each block, a reference image used for an inter-prediction. In this case, the inter-prediction unit 202 performs a first stage search and a latter stage search for each reference image.

Figure 20B:
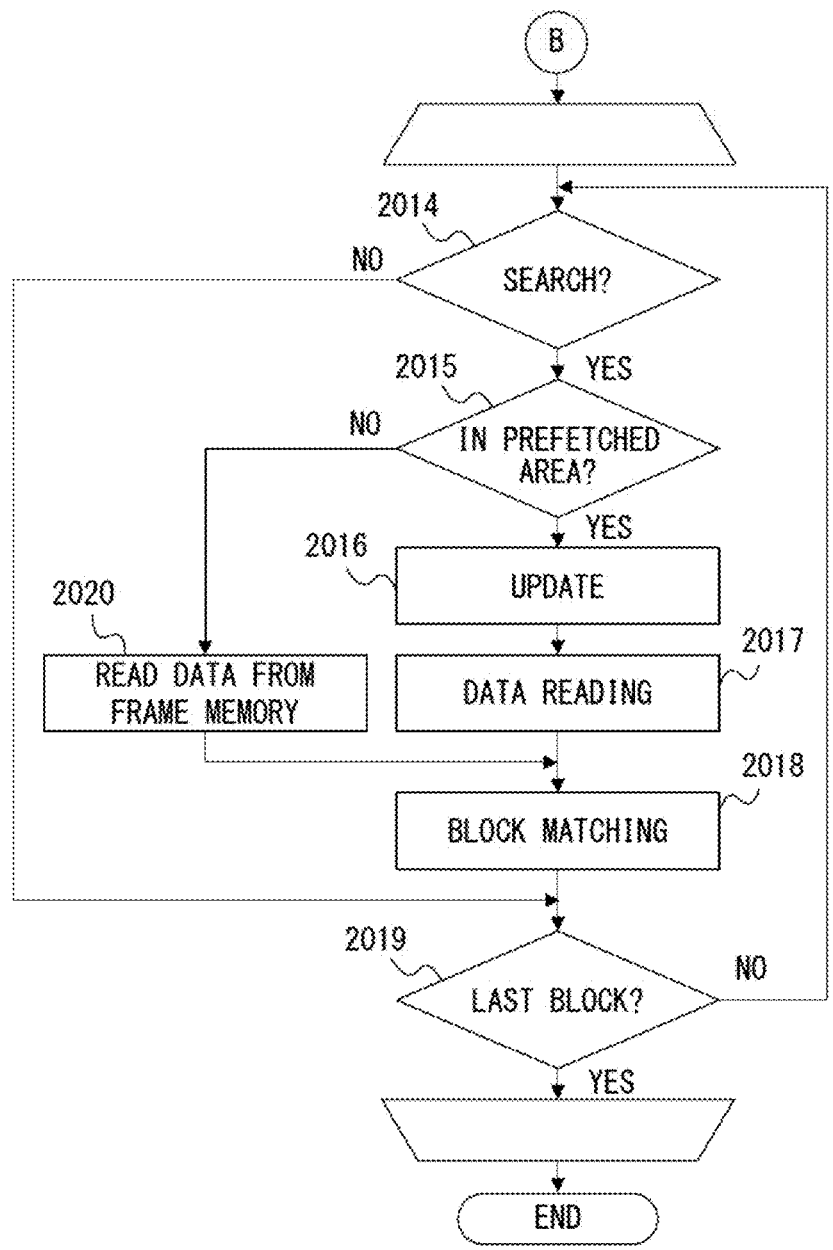
FIG. 20B is the flowchart (Part 2) of the inter-prediction processing using a plurality of reference images.

FIGS. 20A and 20B are a flowchart that illustrates an example of inter-prediction processing using a plurality of reference images. First, the search unit 1012 selects a reference image and performs a first stage search using the selected reference image, so as to generate a determination result (Step 2001). Next, the determination unit 1014 performs the processes of Steps 2002 to 2011, so as to generate a determination result.

The processes of Steps 2001 to 2003, 2005, 2006, and 2007 are similar to those of Steps 1401 to 1405 and 1408 of FIG. 14A.

When it has been predicted that a block matching will be unsuccessful (Step 2003, NO), the evaluation unit 1303 calculates an evaluation value (Step 2007), and then checks a result of a prediction using another reference image that is different from the selected reference image (Step 2008).

In a first stage search using another reference image, there may exist a certain block that is situated at the same position as a selected block and is identical to the selected block in shape, wherein, with respect to the certain block, it has been predicted in Step 2003 that a block matching will be successful. In this case (Step 2008, YES), the evaluation unit 1303 gives a decreased priority to the selected block and stores an evaluation value in the evaluation value buffer 1305 (Step 2009)

For example, in Step 2009, an evaluation value is stored in a low-priority area provided in the evaluation value buffer 1305. This permits a decrease in the probability that it will be determined that an area situated outside a prefetched area is to be searched with respect to the selected block.

When it has not been predicted in the prediction using any of the reference images that a block matching will be successful with respect to one block (Step 2008, NO), the evaluation unit 1303 stores an evaluation value in the evaluation value buffer 1305 (Step 2010). In this case, the evaluation value is stored in an area other than the low-priority area.

When it has been determined that a block matching will be successful (Step 2003, YES), the evaluation unit 1303 checks a result of a prediction using another reference image (Step 2004). When it has not been predicted in the prediction using any of the reference images that a block matching will be unsuccessful with respect to one block (Step 2004, NO), the evaluation unit 1303 stores a determination result in the determination result buffer 1306 (Step 2005).

When it has been predicted in the prediction using another reference image that a block matching will be unsuccessful with respect to one block (Step 2004, YES), the evaluation unit 1303 performs the process of Step 2005 after it performs the process of Step 2011. In Step 2011, the evaluation unit 1303 moves, to the low-priority area, an evaluation value that is calculated using the another reference image and stored in the evaluation value buffer 1305.

When the selected block is the last block (Step 2006, YES), the search unit 1012 selects a next reference image and repeats the processes of and after Step 2001. This results in accumulating, in the evaluation value buffer 1305, an evaluation value for each block in an encoding target image for each reference image.

When all of the reference images have been selected, the search determination unit 1304 determines, on the basis of the evaluation value in the evaluation value buffer 1305, whether an area situated outside a prefetched area is to be searched with respect to each block when each of the reference images is used (Step 2012). Here, the search determination unit 1304 can determine whether the outside area is to be searched using the upper limit N, as in the case of Step 1406. Then, the search determination unit 1304 stores a determination result for each block with respect to all of the reference images in the determination result buffer 1306 (Step 2013).

Next, in a latter stage search, the search unit 1013 selects a reference image and performs the processes of Steps 2014 to 2020 using the selected reference image, so as to generate an inter-prediction result. The processes of Steps 2014 to 2020 are similar to the processes of Steps 1410 to 1416 of FIG. 14A.

This inter-prediction processing permits giving of decreased priority to a block for which it has been predicted that a block matching will be successful using another reference image, which results in being able to increase a priority for a block for which it has never been predicted that a block matching will be successful. Accordingly, in a latter stage search, an inter-prediction result is more likely to be generated for each block, and the probability that an inter-prediction result will be selected by the selector 203 is increased, which results in an improvement in compression efficiency.

FIG. 21 illustrates an example of the determination result buffer 1306 of the inter-prediction processing using a plurality of reference images. In this example, two reference images R1 and R2 are used, and a first stage search using the reference image R1 is performed first and a first stage search using the reference image R2 is then performed.

In a first stage search using the reference image R1, an encoding target image is divided into 14 blocks B1 to B14. From among these blocks, with respect to the blocks B1, B2, B5 to B7, B9, and B11 to B13, it is predicted that a block matching in a prefetched area will be successful. On the other hand, with respect to the blocks B3, B4, B8, B10, and B14, it is predicted that a block matching in the prefetched area will be unsuccessful.

In a first stage search using the reference image R2, an encoding target image is divided into 13 blocks B15 to B27. From among these blocks, with respect to the blocks B16, B17, B19 to B21, and B24 to B26, it is predicted that a block matching in a prefetched area will be successful. On the other hand, with respect to the blocks B15, B18, B22, B23, and B27, it is predicted that a block matching in the prefetched area will be unsuccessful.

In this case, the determination result D1 is stored in entries for the blocks B1, B2, B5 to B7, B9, and B11 to B13 in the determination result buffer 1306. The determination result D1 is also stored in entries for the blocks B16, B17, B19 to B21, and B24 to B26.

The evaluation value buffer 1305 stores, in ascending order of E2, entries 2101-1 to 2101-10 that respectively correspond to ten blocks for which it has been predicted that a block matching will be unsuccessful.

However, the block B1 in the first stage search using the reference image R1 is a block that is situated at the same position as the block B15 and is identical to the block B15 in shape, the block B15 being a block in the first stage search using the reference image R2. Thus, in a prediction for the block B15, a prediction result for the block B1 is checked. When it has been predicted that a block matching will be successful with respect to the block B1 (the determination result D1), the entry 2101-8 for the block B15 is stored in a low-priority area 2103.

Likewise, in a prediction for the block B17, a prediction result for the block B3 is checked. When it has been predicted that a block matching will be unsuccessful with respect to the block B3 (the determination result D3), the entry 2101-9 for the block B3 moves to the low-priority area 2103.

In a prediction for the block B21, a prediction result for the block B8 is checked, and when it has been predicted that a block matching will be unsuccessful with respect to the block B8, the entry 2101-10 for the block B8 moves to the low-priority area 2103.

In a prediction for the block B22, a prediction result for the block B9 is checked, and when it has been predicted that a block matching will be successful with respect to the block B9, the entry 2101-7 for the block B22 is stored in the low-priority area 2103.

The entries 2101-7 to 2101-10 in the low-priority area 2103 are sorted on the basis of the values of their E2s, and they are not affected by the values of E2s of the entries 2101-1 to 2101-6. The following are values of E2 and E1 of each of the entries.

Entry 2101-1 B23 E2=102, E1=27
Entry 2101-2 B18 E2=126, E1=32
Entry 2101-3 B10 E2=128, E1=35
Entry 2101-4 B27 E2=131, E1=40
Entry 2101-5 B14 E2=134, E1=40
Entry 2101-6 B4 E2=140, E1=26
Entry 2101-7 B22 E2=131, E1=26
Entry 2101-8 B15 E2=154, E1=34
Entry 2101-9 B3 E2=178, E1=56
Entry 2101-10 B8 E2=180, E1=52

For example, when the upper limit N is 150, a sum of E1s of the entries 2101-1 to 2101-4 in a range 2102 is 134, which is not greater than N. Then, with respect to the blocks B23, B18, B10, and B27, it is determined that an area situated outside a prefetched area is to be searched, and the determination result D2 is stored in the entries for these blocks in the determination result buffer 1306.

On the other hand, with respect to the blocks B14, B4, B22, B15, B3, and B8, it is determined that a search is not to be performed, and the determination result D3 is stored in the entries for these blocks in the determination result buffer 1306.

The configurations of the image compressing device 101 of FIG. 1, the mode determination unit 111 of FIG. 2, and the inter-prediction unit 202 of FIG. 3 are merely examples, and some of the components may be omitted or changed according to the applications or the requirements of the image compressing device 101.

The configurations of the image compressing device 1001 of FIG. 10, the inter-prediction unit 202 of FIG. 12, and the determination unit 1014 of FIG. 13 are merely examples, and some of the components may be omitted or changed according to the applications or the requirements of the image compressing device 1001. For example, when it is determined in the determination unit 1014 of FIG. 13, without using an evaluation value, whether an area situated outside a prefetched area is to be searched, the evaluation unit 1303 and the evaluation value buffer 1305 can be omitted.

The flowcharts of FIGS. 5, 11, 14A and 14B, 18, and 20A and 20B are merely examples, and some of the processes may be omitted or changed according to the configurations or the requirements of the image compressing device. For example, when it is determined in the inter-prediction processing of FIG. 14A, without using an evaluation value, whether an area situated outside a prefetched area is to be searched, the processes of Step 1408 and Step 1409 can be omitted.

In Step 1401 of FIG. 14A, Step 1414 of FIG. 14B, Step 2001 of FIG. 20A, and Step 2018 of FIG. 20B, another indicator that indicates a dissimilarity between a block and a reference image may be used. For example, a search result or an inter-prediction result that includes a sum-of-square differences between a block and a reference image may be generated.

The search ranges and the prefetched areas of FIGS. 4, 6A to 8, and 15 are merely examples, and other search ranges and prefetched areas may be used according to the configurations or the requirements of the image compressing device. The original image and the reduced image of FIG. 9 are merely examples, and another original image or reduced image may be used according to the configurations or the requirements of the image compressing device.

The motion vectors and the matching target areas of FIG. 15 are merely examples, and other motion vector and matching target areas may be generated according to an input video signal. The prediction result of FIG. 16 and the entries in the evaluation value buffers and the determination result buffers of FIGS. 17, 19, and 21 are merely examples, and another prediction result or other entries may be generated according to an input video signal.

Formulas (1) to (4) are merely examples, and other formulations may be used according to the configurations or the requirements of the image compressing device. For example, instead of the simple evaluation value E1 and the detailed evaluation value E2 in formulas (1) and (2) being used, another evaluation value representing the number of memory accesses may be used, and instead of RSAD in formula (3) being used, another indicator indicating a dissimilarity between a block and a reference image may be used.

The image compressing device 101 of FIG. 1 and the image compressing device 1001 of FIG. 10 may be implemented as a hardware circuit or may be implemented using an information processing device (a computer) illustrated in FIG. 22.

The information processing device of FIG. 22 includes a central processing unit (CPU) 2201, a memory 2202, an input device 2203, an output device 2204, an auxiliary storage 2205, a medium driving device 2206, and a network connecting device 2207. These components are connected to one another via a bus 2208. The frame memory 102 of FIG. 1 may be connected to the bus 2208.

The memory 2202 is, for example, a semiconductor memory such as a read only memory (ROM), a random access memory (RAM), or a flash memory, and stores a program and data used for performing image compressing processing. The memory 2202 can be used as the prefetch memory 301 of FIG. 3, the prefetched-image storage 1011 of FIG. 10, the prefetch memory 1201 of FIG. 12, the evaluation value buffer 1305 and the determination result buffer 1306 of FIG. 13.

For example, the CPU 2201 (a processor) operates as the mode determination unit 111 and the encoding unit 112 of FIG. 1 by executing the program by use of the memory 2202. The CPU 2201 also operates as the intra-prediction unit 201, the inter-prediction unit 202, the selector 203 of FIG. 2, and the search unit 302 of FIG. 3.

The CPU 2201 operates as the search unit 1012, the search unit 1013, the determination unit 1014, and the encoding unit 1015 of FIG. 10 by executing the program by use of the memory 2202. The CPU 2201 also operates as the determination unit 1014 of FIG. 12, and the prediction unit 1301, the position calculator 1302, the evaluation unit 1303, and the search determination unit 1304 of FIG. 13.

The input device 2203 is, for example, a keyboard or a pointing device, and is used for inputting instructions or information from a user or an operator. The output device 2204 is, for example, a display, a printer, or a speaker, and is used for outputting inquiries to the user or the operator or for outputting a result of processing.

The auxiliary storage 2205 is, for example, a magnetic disk device, an optical disk device, a magneto-optical disk device, or a tape device. The auxiliary storage 2205 may be a hard disk drive. The information processing device can store the program and the data in the auxiliary storage 2505 so as to load them into the memory 2202 and use them.

The medium driving device 2206 drives a portable recording medium 2209 so as to access the recorded content. The portable recording medium 2209 is, for example, a memory device, a flexible disk, an optical disc, or a magneto-optical disk. The portable recording medium 2209 may be, for example, a compact disk read only memory (CD-ROM), a digital versatile disk (DVD), or a universal serial bus (USB) memory. The user or the operator can store the program and the data in the portable recording medium 2209 so as to load them into the memory 2202 and use them.

As described above, a computer-readable recording medium that stores therein a program and data used for performing processing is a physical (non-transitory) recording medium such as the memory 2202, the auxiliary storage 2205, and the portable recording medium 2209.

The network connecting device 2207 is a communication interface that is connected to a communication network such as a local area network (LAN) or the Internet and makes a data conversion associated with communication. The network connecting device 2207 can also transmit an encoded stream to an image restoring device. The information processing device can also receive the program and the data from an external device via the network connecting device 2207 so as to load them into the memory 2202 and use them.

The information processing device does not necessarily include all of the components in FIG. 22, and some of the components can be omitted according to the applications or the requirements. For example, when there is no need for an interface with the user or the operator, the input device 2203 and the output device 2204 may be omitted. When the information processing device does not access the portable recording medium 2209, the medium driving device 2206 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image compressing device comprising:
a prefetched-image memory that stores a prefetched image of a prefetched area prefetched from a reference image memory that stores a reference image; and
a processor that
performs a motion search using a reduced image obtained by reducing an encoding target image and generates a search result for an encoding target block included in the encoding target image,
determines, on the basis of the search result, that an area situated outside the prefetched area in the reference image is to be searched when the processor has predicted from the search result that a matching of the encoding target block and the prefetched image will be unsuccessful,
performs a matching of the encoding target block and an image of a matching target area including the outside area in the reference image when the processor has determined that the outside area is to be searched and generates an inter-prediction result, and
encodes the encoding target block on the basis of the inter-prediction result.

2. The image compressing device according to claim 1, wherein
the processor determines the matching target area in the reference image on the basis of the search result, and predicts that the matching of the encoding target block and the prefetched image will be unsuccessful when the matching target area is not within the prefetched area.

3. The image compressing device according to claim 2, wherein
the processor calculates an evaluation value of a number of accesses to be made to the reference image memory in order to read an image of the outside area, and determines whether the outside area is to be searched, on the basis of the evaluation value.

4. The image compressing device according to claim 3, wherein
the processor generates a plurality of search results respectively corresponding to a plurality of blocks included in the encoding target image, calculates a plurality of evaluation values respectively corresponding to the plurality of blocks when the processor has predicted that a matching will be unsuccessful for the plurality of blocks, and determines whether the outside area is to be searched with respect to each of the plurality of blocks, on the basis of a result of comparing the plurality of evaluation values.

5. The image compressing device according to claim 4, wherein
the processor weights each of a plurality of numbers of accesses respectively corresponding to the plurality of blocks by using a dissimilarity between each of the plurality of blocks respectively indicated by the plurality of search results and the reference image, so as to calculate the plurality of evaluation values.

6. The image compressing device according to claim 1, wherein
the reference image memory further stores another reference image that is different from the reference image,
the prefetched-image memory further stores another prefetched image of a prefetched area prefetched from the another reference image, and
when the processor has predicted that a matching of the encoding target block and the another prefetched image will be successful, the processor decreases a probability that the outside area will be determined to be searched with respect to the encoding target block.

7. An image compressing method comprising:
performing, by an image compressing device, a motion search using a reduced image obtained by reducing an encoding target image and generating a search result for an encoding target block included in the encoding target image, the image compressing device storing a prefetched image of a prefetched area prefetched from a reference image memory that stores a reference image;
determining, by the image compressing device and on the basis of the search result, that an area situated outside the prefetched area in the reference image is to be searched when a matching of the encoding target block and the prefetched image has been predicted to be unsuccessful from the search result;
performing, by the image compressing device, a matching of the encoding target block and an image of a matching target area including the outside area in the reference image and generating an inter-prediction result; and
encoding, by the image compressing device, the encoding target block on the basis of the inter-prediction result.

8. The image compressing method according to claim 7, further comprising:
determining the matching target area in the reference image on the basis of the search result; and
predicting that the matching of the encoding target block and the prefetched image will be unsuccessful when the matching target area is not within the prefetched area.

9. The image compressing device according to claim 8, further comprising:
calculating an evaluation value of a number of accesses to be made to the reference image memory in order to read an image of the outside area; and
determining whether the outside area is to be searched, on the basis of the evaluation value.

10. The image compressing method according to claim 9, wherein
the generating the search result generates a plurality of search results respectively corresponding to a plurality of blocks included in the encoding target image,
the calculating the evaluation value calculates a plurality of evaluation values respectively corresponding to the plurality of blocks when a matching has been predicted to be unsuccessful for the plurality of blocks, and
the determining whether the outside area is to be searched determines whether the outside area is to be searched with respect to each of the plurality of blocks, on the basis of a result of comparing the plurality of evaluation values.

11. A non-transitory computer-readable recording medium having stored therein an image compressing program causing a computer to execute a process, the computer storing a prefetched image of a prefetched area prefetched from a reference image memory that stores a reference image, the process comprising:
performing a motion search using a reduced image obtained by reducing an encoding target image and generating a search result for an encoding target block included in the encoding target image;
determining, on the basis of the search result, that an area situated outside the prefetched area in the reference image is to be searched when a matching of the encoding target block and the prefetched image has been predicted to be unsuccessful from the search result;
performing a matching of the encoding target block and an image of a matching target area including the outside area in the reference image and generating an inter-prediction result; and encoding the encoding target block on the basis of the inter-prediction result.

12. The non-transitory computer-readable recording medium according to claim 11, further comprising:
determining the matching target area in the reference image on the basis of the search result; and
predicting that the matching of the encoding target block and the prefetched image will be unsuccessful when the matching target area is not within the prefetched area.

13. The non-transitory computer-readable recording medium according to claim 12, further comprising:
calculating an evaluation value of a number of accesses to be made to the reference image memory in order to read an image of the outside area; and
determining whether the outside area is to be searched, on the basis of the evaluation value.

14. The non-transitory computer-readable recording medium according to claim 13, wherein
the generating the search result generates a plurality of search results respectively corresponding to a plurality of blocks included in the encoding target image,
the calculating the evaluation value calculates a plurality of evaluation values respectively corresponding to the plurality of blocks when a matching has been predicted to be unsuccessful for the plurality of blocks, and
the determining whether the outside area is to be searched determines whether the outside area is to be searched with respect to each of the plurality of blocks, on the basis of a result of comparing the plurality of evaluation values.

* * * * *